(12) United States Patent
Zbinden

(10) Patent No.: US 12,487,419 B2
(45) Date of Patent: Dec. 2, 2025

(54) VERTICAL INSERTION INTERCONNECTION SYSTEM WITH RING CONNECTOR FOR HIGH-SPEED DATA TRANSMISSION

(71) Applicant: SAMTEC, INC., New Albany, IN (US)

(72) Inventor: Eric Zbinden, Santa Clara, CA (US)

(73) Assignee: SAMTEC, INC., New Albany, IN (US)

( * ) Notice: Subject to any disclaimer, the term of this patent is extended or adjusted under 35 U.S.C. 154(b) by 214 days.

(21) Appl. No.: 18/248,944

(22) PCT Filed: Oct. 13, 2021

(86) PCT No.: PCT/US2021/054749
§ 371 (c)(1),
(2) Date: Apr. 13, 2023

(87) PCT Pub. No.: WO2022/081683
PCT Pub. Date: Apr. 21, 2022

(65) Prior Publication Data
US 2023/0393355 A1     Dec. 7, 2023

Related U.S. Application Data

(60) Provisional application No. 63/091,148, filed on Oct. 13, 2020.

(51) Int. Cl.
*H04B 10/00* (2013.01)
*G02B 6/42* (2006.01)

(52) U.S. Cl.
CPC ......... *G02B 6/4261* (2013.01); *G02B 6/4214* (2013.01); *G02B 6/4244* (2013.01);
(Continued)

(58) Field of Classification Search
CPC .. G02B 6/4261; G02B 6/4214; G02B 6/4244; G02B 6/4269; G02B 6/4278;
(Continued)

(56) References Cited

U.S. PATENT DOCUMENTS 6,081,027 A    6/2000  Akram
6,142,802 A   11/2000  Berg et al.
(Continued)

FOREIGN PATENT DOCUMENTS

JP    2012-134178 A    7/2012
TW       D206845 S    9/2020
(Continued)

OTHER PUBLICATIONS

OE-TEK Inc., Clamp for MT Ferrule, Product Description, retrieved from https://www.oetek.com.tw/products_detail/25.htm, visited Jun. 25, 2023.
(Continued)

*Primary Examiner* — Agustin Bello
(74) *Attorney, Agent, or Firm* — BakerHostetler

(57) ABSTRACT

An interconnect module and mating ring connector are described. The interconnect module may be a transceiver, transmitter, or receiver that is part of an optical communication system. The interconnect module has a low profile and small footprint. The interconnection system is capable of transferring information at high data rates.

26 Claims, 23 Drawing Sheets

(52) U.S. Cl.
CPC ......... *G02B 6/4269* (2013.01); *G02B 6/4278* (2013.01); *G02B 6/428* (2013.01)

(58) Field of Classification Search
CPC .... G02B 6/428; G02B 6/4246; G02B 6/4249; H01R 12/716; H01R 12/79; H01R 12/88
See application file for complete search history.

(56) References Cited

U.S. PATENT DOCUMENTS

| | | | |
|---|---|---|---|
| 6,325,552 B1 | 12/2001 | Brillhart | |
| 6,386,768 B1* | 5/2002 | Yoon | G02B 6/4292 |
| | | | 385/88 |
| 6,592,269 B1 | 7/2003 | Brophy et al. | |
| 6,644,980 B2 | 11/2003 | Kameda | |
| 6,705,769 B2 | 3/2004 | Brezina et al. | |
| 6,762,796 B1* | 7/2004 | Nakajoh | H04N 23/55 |
| | | | 348/340 |
| 6,940,723 B2 | 9/2005 | Ice et al. | |
| 7,264,403 B1* | 9/2007 | Danley | G02B 6/3863 |
| | | | 385/83 |
| 7,314,377 B2 | 1/2008 | Northey et al. | |
| 7,329,054 B1* | 2/2008 | Epitaux | G02B 6/4249 |
| | | | 385/89 |
| 7,331,812 B2* | 2/2008 | Nishio | H01R 13/639 |
| | | | 439/342 |
| 7,435,145 B2* | 10/2008 | Nishio | G02B 6/4277 |
| | | | 439/71 |
| 7,489,514 B2 | 2/2009 | Hamasaki et al. | |
| 7,559,702 B2 | 7/2009 | Fujiwara et al. | |
| 7,833,042 B2* | 11/2010 | Nishio | H01R 13/658 |
| | | | 439/160 |
| 7,866,898 B2* | 1/2011 | Ishikawa | G02B 6/4284 |
| | | | 385/88 |
| 8,047,856 B2* | 11/2011 | McColloch | G02B 6/3885 |
| | | | 439/71 |
| 8,351,794 B2* | 1/2013 | Meadowcroft | G02B 6/4246 |
| | | | 398/139 |
| 8,382,384 B2* | 2/2013 | Nekado | G02B 6/4249 |
| | | | 385/14 |
| 8,475,054 B2 | 7/2013 | Shimotsu et al. | |
| 8,588,561 B2* | 11/2013 | Zbinden | G02B 6/4261 |
| | | | 385/14 |
| 9,158,082 B2* | 10/2015 | Asai | G02B 6/4277 |
| 9,318,835 B2* | 4/2016 | Chen | H01R 9/0524 |
| 9,379,467 B2* | 6/2016 | Shimotsu | G02B 6/4284 |
| 9,417,414 B2* | 8/2016 | Shimotsu | G02B 6/4274 |
| 9,419,380 B2 | 8/2016 | Sharf et al. | |
| 9,442,255 B2 | 9/2016 | Pommer et al. | |
| 9,465,176 B2 | 10/2016 | Pommer et al. | |
| 9,494,750 B2* | 11/2016 | Lee | G02B 6/3821 |
| 9,606,305 B1* | 3/2017 | Yu | G02B 6/32 |
| 9,641,254 B1 | 5/2017 | Shen et al. | |
| 9,735,484 B2 | 8/2017 | Brubaker et al. | |
| 9,864,146 B1* | 1/2018 | Fu | G02B 6/4243 |
| 9,880,367 B2* | 1/2018 | Faw | G02B 6/3885 |
| 9,991,615 B1* | 6/2018 | Herring | H01R 12/7017 |
| 10,264,675 B2* | 4/2019 | Herring | H05K 1/141 |
| 10,290,962 B2* | 5/2019 | Harmon, III | H01R 12/716 |
| 10,297,963 B2* | 5/2019 | Herring | H01R 27/02 |
| 10,312,633 B2* | 6/2019 | Tryson | H01R 12/716 |
| 10,355,385 B1* | 7/2019 | Bulmer | H01R 12/88 |
| 10,466,273 B1* | 11/2019 | Hwang | H01R 12/716 |
| 10,466,427 B2* | 11/2019 | Wang | G02B 6/4292 |
| 10,976,506 B2* | 4/2021 | Matsui | G02B 6/4249 |
| 11,067,764 B2* | 7/2021 | Liao | G02B 6/426 |
| 11,099,329 B1* | 8/2021 | Psaila | G02B 19/0014 |
| 11,125,956 B2* | 9/2021 | Zbinden | G02B 6/4283 |
| 11,165,509 B1* | 11/2021 | Nagarajan | H01L 23/5384 |
| 11,178,473 B1* | 11/2021 | Nagarajan | H04B 10/40 |
| 11,621,528 B2* | 4/2023 | Ishida | H01R 13/665 |
| | | | 439/620.21 |
| D985,511 S | 5/2023 | Kan et al. | |
| 2002/0172472 A1* | 11/2002 | Nelson | G02B 6/4212 |
| | | | 385/39 |
| 2003/0072538 A1* | 4/2003 | Jin | G02B 6/4225 |
| | | | 385/89 |
| 2004/0118587 A1* | 6/2004 | Gilliland | H01L 25/165 |
| | | | 174/541 |
| 2004/0192091 A1 | 9/2004 | Yunker et al. | |
| 2005/0013560 A1 | 1/2005 | Mazotti et al. | |
| 2006/0045421 A1* | 3/2006 | Baets | G02B 6/4253 |
| | | | 385/33 |
| 2006/0104576 A1* | 5/2006 | Nagasaka | G02B 6/4292 |
| | | | 385/88 |
| 2006/0270283 A1* | 11/2006 | Kumazawa | G02B 6/3897 |
| | | | 439/676 |
| 2006/0291784 A1* | 12/2006 | Wang | G02B 6/4284 |
| | | | 385/88 |
| 2007/0009213 A1 | 1/2007 | Meadowcroft et al. | |
| 2007/0122090 A1* | 5/2007 | Nishio | G02B 6/4201 |
| | | | 385/92 |
| 2007/0123089 A1* | 5/2007 | Nishio | H01R 13/639 |
| | | | 439/342 |
| 2007/0134950 A1* | 6/2007 | Huang | H01R 12/88 |
| | | | 439/73 |
| 2007/0258683 A1* | 11/2007 | Rolston | G02B 6/43 |
| | | | 385/88 |
| 2008/0081506 A1* | 4/2008 | Hoshino | H01R 13/629 |
| | | | 439/374 |
| 2009/0061652 A1* | 3/2009 | Fan | H01R 13/6595 |
| | | | 439/135 |
| 2009/0081894 A1* | 3/2009 | Liao | H01R 12/88 |
| | | | 439/345 |
| 2009/0208168 A1* | 8/2009 | Ishikawa | H01R 12/79 |
| | | | 439/620.22 |
| 2009/0233477 A1* | 9/2009 | Ma | H01R 12/88 |
| | | | 439/331 |
| 2009/0245736 A1 | 10/2009 | Ahadian et al. | |
| 2009/0280666 A1* | 11/2009 | Yeh | H01R 12/88 |
| | | | 439/246 |
| 2009/0297101 A1* | 12/2009 | Ono | G02B 6/4245 |
| | | | 385/53 |
| 2009/0302876 A1* | 12/2009 | Koizumi | G01R 31/2863 |
| | | | 324/756.07 |
| 2010/0055939 A1* | 3/2010 | Hsu | H01R 12/88 |
| | | | 439/73 |
| 2010/0130048 A1* | 5/2010 | Fan | H05K 7/1053 |
| | | | 439/331 |
| 2010/0142895 A1* | 6/2010 | Hsu | H01R 12/707 |
| | | | 385/75 |
| 2010/0171023 A1* | 7/2010 | Asahi | G02B 6/4214 |
| | | | 250/227.11 |
| 2010/0184314 A1* | 7/2010 | Yeh | H01R 12/88 |
| | | | 439/157 |
| 2010/0303423 A1 | 12/2010 | McColloch | |
| 2011/0014800 A1* | 1/2011 | Cheng | H01R 12/716 |
| | | | 439/55 |
| 2011/0151708 A1* | 6/2011 | Kaneko | H01R 12/714 |
| | | | 439/660 |
| 2011/0230063 A1* | 9/2011 | Tang | H05K 7/1061 |
| | | | 439/55 |
| 2012/0051706 A1* | 3/2012 | van Geffen | G02B 6/3833 |
| | | | 29/464 |
| 2012/0063718 A1 | 3/2012 | Steijer et al. | |
| 2012/0142209 A1* | 6/2012 | Yeh | H01R 12/88 |
| | | | 439/345 |
| 2012/0156919 A1* | 6/2012 | Yeh | H05K 7/1007 |
| | | | 439/370 |
| 2012/0267498 A1* | 10/2012 | Tsai | H01R 12/88 |
| | | | 248/291.1 |
| 2012/0307458 A1* | 12/2012 | Bolanowski | H05K 7/1069 |
| | | | 361/728 |
| 2013/0004120 A1* | 1/2013 | Zbinden | G02B 6/4249 |
| | | | 385/14 |
| 2013/0243378 A1* | 9/2013 | Asai | G02B 6/4277 |
| | | | 385/89 |
| 2013/0279860 A1* | 10/2013 | Hung | G02B 6/423 |
| | | | 385/89 |

(56) References Cited

U.S. PATENT DOCUMENTS

| | | | |
|---|---|---|---|
| 2015/0030299 A1* | 1/2015 | Chan | G02B 6/4292 |
| | | | 385/134 |
| 2015/0079832 A1* | 3/2015 | Gordon | H01R 43/205 |
| | | | 29/842 |
| 2015/0373834 A1 | 12/2015 | Engel et al. | |
| 2015/0378116 A1* | 12/2015 | Zbinden | G02B 6/4292 |
| | | | 385/89 |
| 2016/0118622 A1* | 4/2016 | Krummacher | H10K 50/805 |
| | | | 438/26 |
| 2016/0156116 A1 | 6/2016 | Kurachi et al. | |
| 2016/0226591 A1 | 8/2016 | Arvelo et al. | |
| 2016/0246019 A1* | 8/2016 | Ishii | G02B 6/4246 |
| 2016/0269118 A1* | 9/2016 | Zbinden | H04B 10/25891 |
| 2017/0090125 A1* | 3/2017 | Kurashima | G02B 6/4231 |
| 2017/0324203 A1* | 11/2017 | Liao | H01R 12/7076 |
| 2017/0338574 A1* | 11/2017 | Ejiri | H01R 13/5202 |
| 2018/0062329 A1* | 3/2018 | Davies | H01R 13/73 |
| 2018/0159253 A1* | 6/2018 | Liao | H05K 7/1007 |
| 2018/0231728 A1 | 8/2018 | Faw et al. | |
| 2018/0309213 A1 | 10/2018 | Harmon, III | |
| 2018/0329156 A1* | 11/2018 | Flaig | H01J 37/32009 |
| 2019/0150311 A1* | 5/2019 | Mason | H05K 3/3436 |
| | | | 439/55 |
| 2019/0245287 A1* | 8/2019 | Su | H01R 13/502 |
| 2019/0267732 A1 | 8/2019 | Buck et al. | |
| 2020/0000407 A1* | 1/2020 | Pacholik | A61B 5/274 |
| 2020/0012056 A1* | 1/2020 | Lian | G02B 6/4292 |
| 2020/0041734 A1* | 2/2020 | Mori | G02B 6/4239 |
| 2020/0264392 A1* | 8/2020 | Li | G02B 6/4403 |
| 2020/0292769 A1* | 9/2020 | Zbinden | H04B 10/25 |
| 2020/0310054 A1 | 10/2020 | Epitaux et al. | |
| 2020/0403334 A1 | 12/2020 | Parkes et al. | |
| 2021/0005994 A1* | 1/2021 | Kuan | H01R 12/88 |
| 2021/0083411 A1* | 3/2021 | Yang | H01R 13/62933 |
| 2021/0148970 A1* | 5/2021 | Miyaaki | H01L 23/32 |
| 2021/0194164 A1* | 6/2021 | Epitaux | H01R 13/26 |
| 2021/0345506 A1* | 11/2021 | Tsuji | H01R 12/7047 |
| 2022/0167493 A1* | 5/2022 | Hashimoto | G02B 6/428 |
| 2022/0350089 A1 | 11/2022 | Puffer et al. | |
| 2023/0393355 A1* | 12/2023 | Zbinden | G02B 6/4278 |

FOREIGN PATENT DOCUMENTS

| | | |
|---|---|---|
| TW | D210569 S | 3/2021 |
| TW | D218587 S | 5/2022 |
| TW | D224000 S | 3/2023 |
| TW | D228333 S | 11/2023 |
| WO | 2018/039351 A1 | 3/2018 |
| WO | 2020/051183 A2 | 3/2020 |
| WO | 2022/081682 A1 | 4/2022 |
| WO | 2022/081683 A1 | 4/2022 |

OTHER PUBLICATIONS

Kuchta, "Multi-wavelength Optical Transceivers Integrated on Node," Enlightened 2018 Annual Meeting, Oct. 2018, retrieved from https://arpa-e.energy.gov/sites/default/files/Kuchta_ENLITENED2018.pdf, 40 pages.

Flexible assemblies allow PCB innovation—Electronic Products, article posted online on May 7, 2010, https://www.electronicproducts.com/Interconnections/Connectors/Flexible_assemblies_allow_PCB_innovation.aspx, retrieved from the internet Sep. 25, 2017.

Samtec, e-Brochure "Ultra Micro Low Speed Optical Flyover," Aug. 2015, 1 page.

Kihara, "Novel MT/MPO Single-Mode Multifiber Connector Technologies for Optical Fiber Communications," Jun. 21, 2017, retrieved from https://www.intechopen.com/chapters/55714, 21 pages.

* cited by examiner

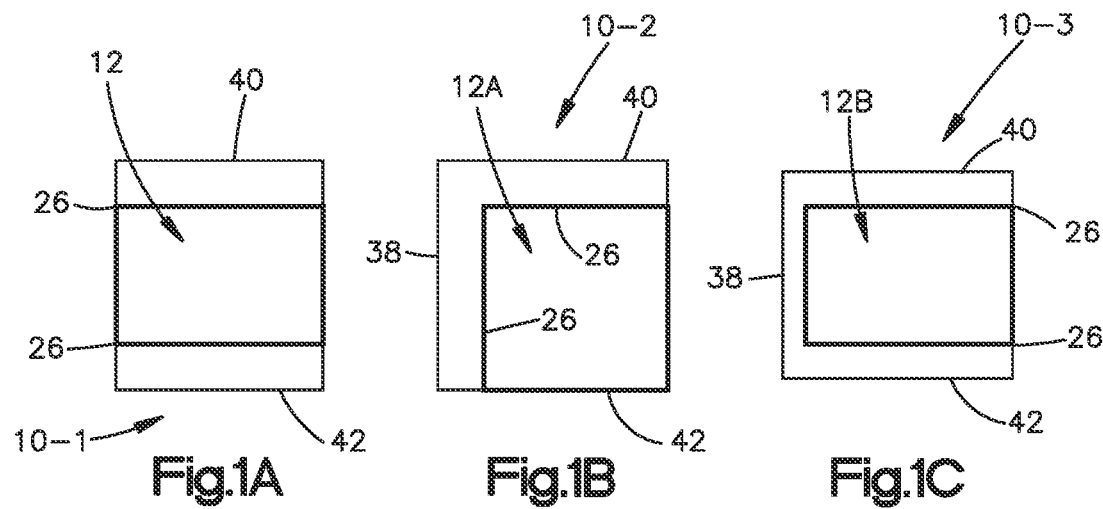
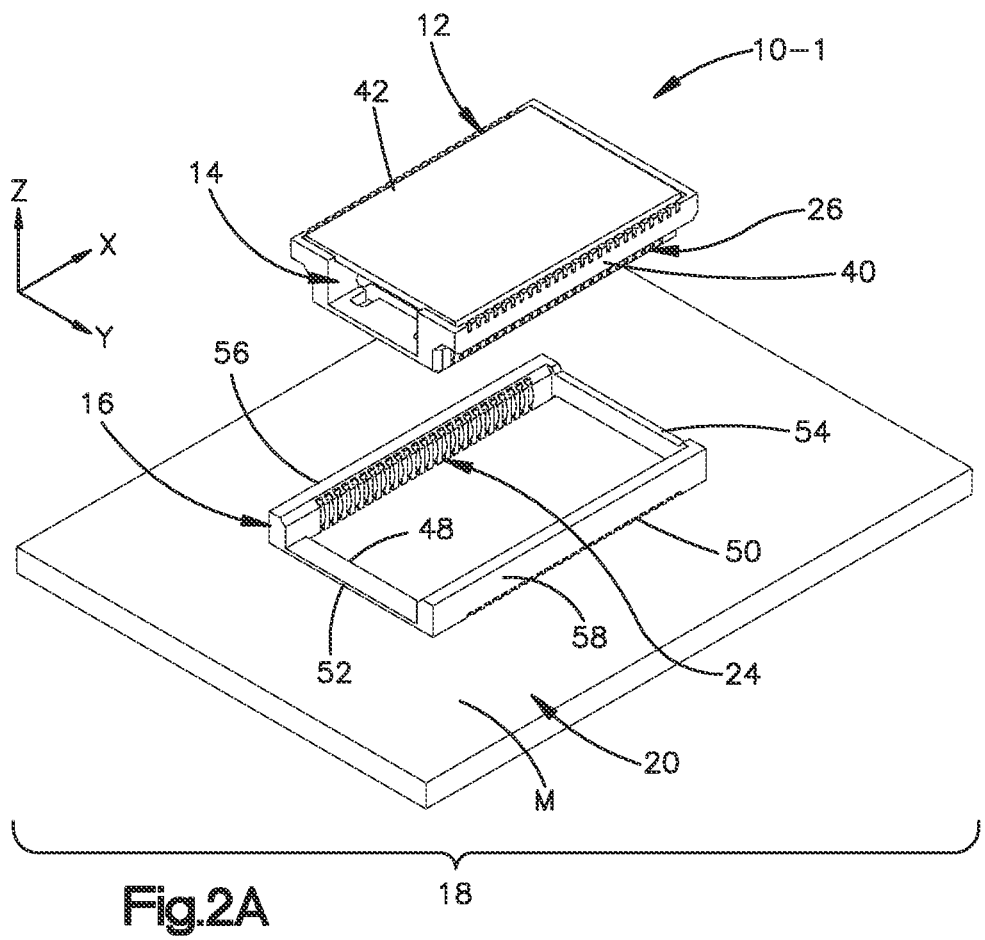

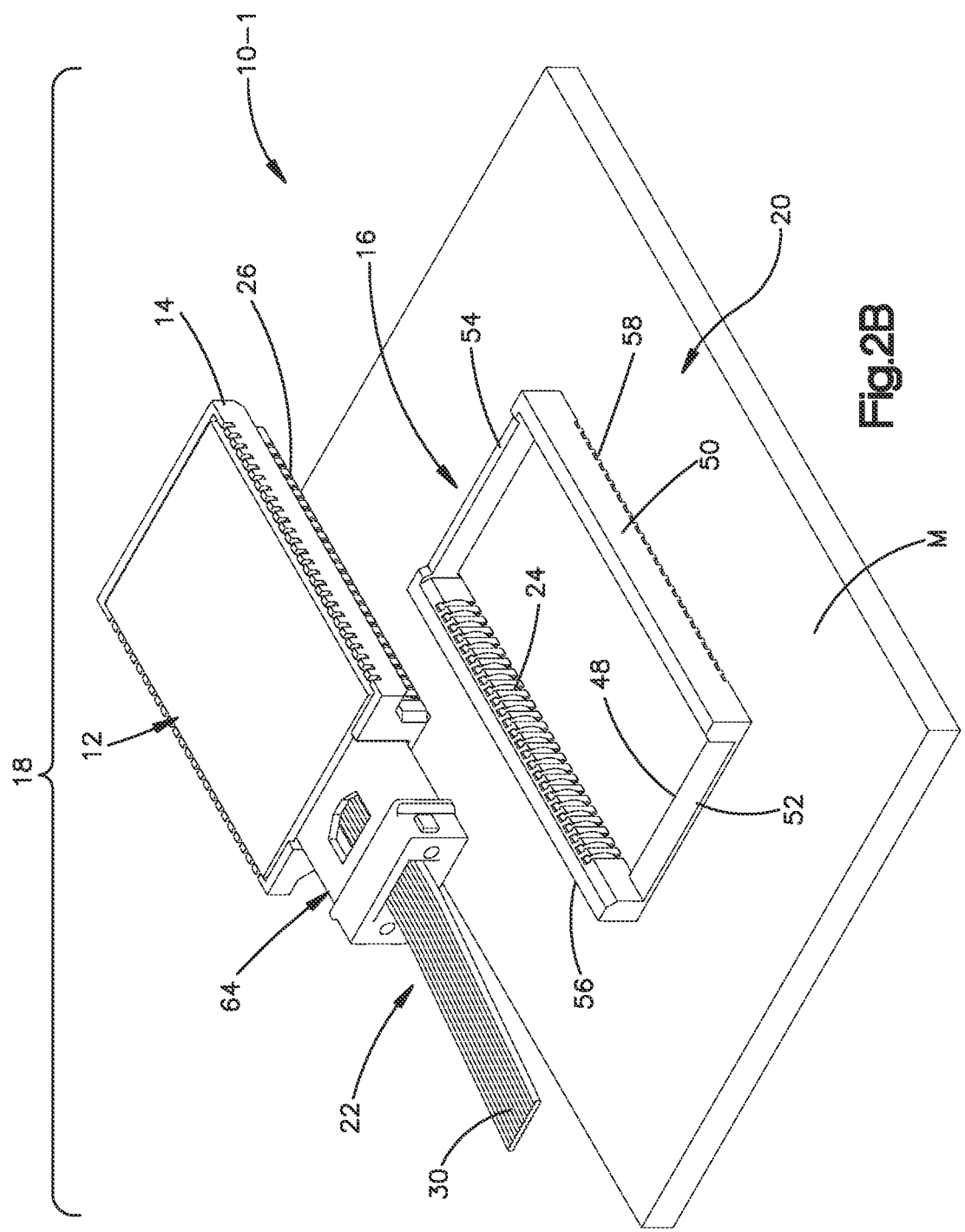

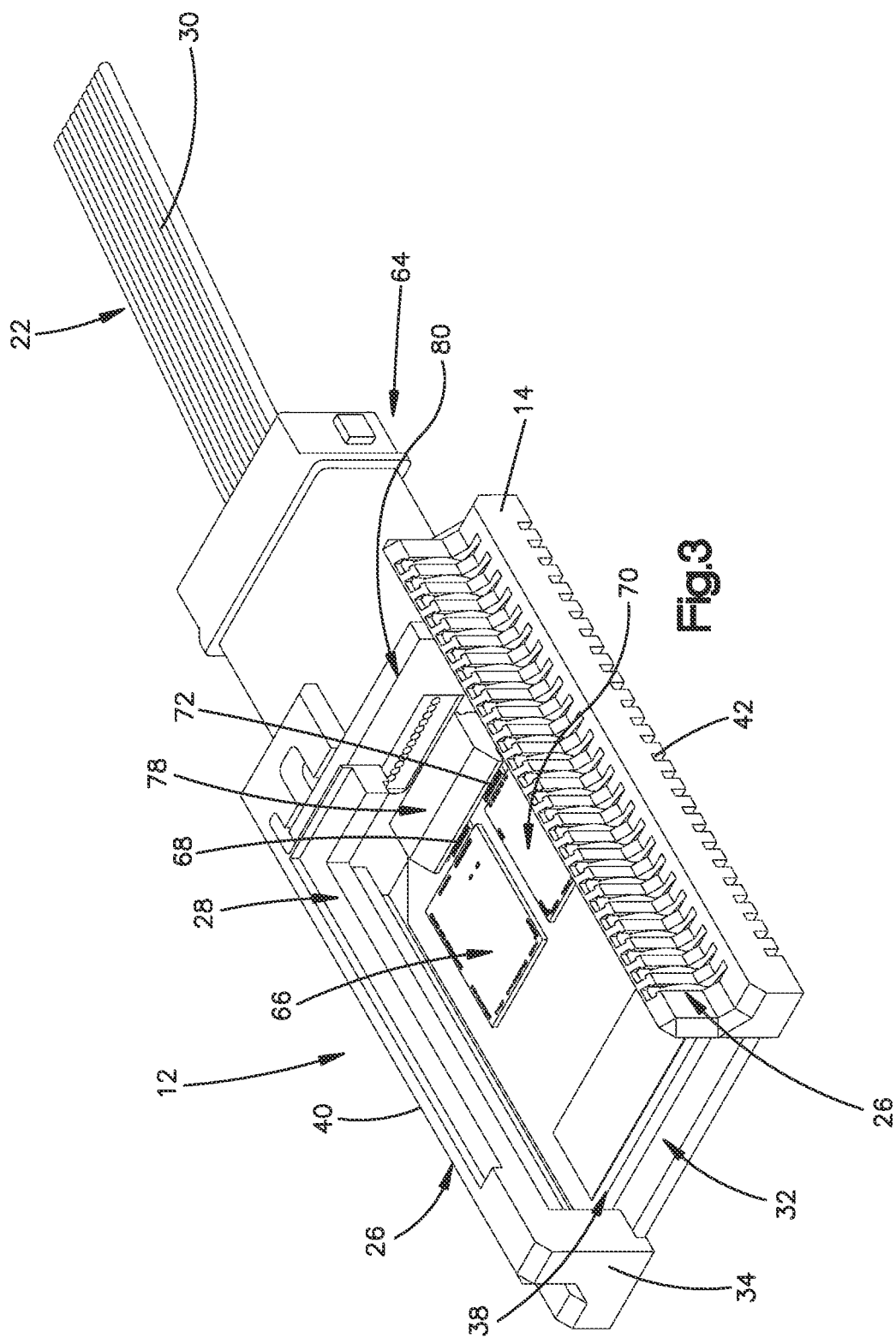

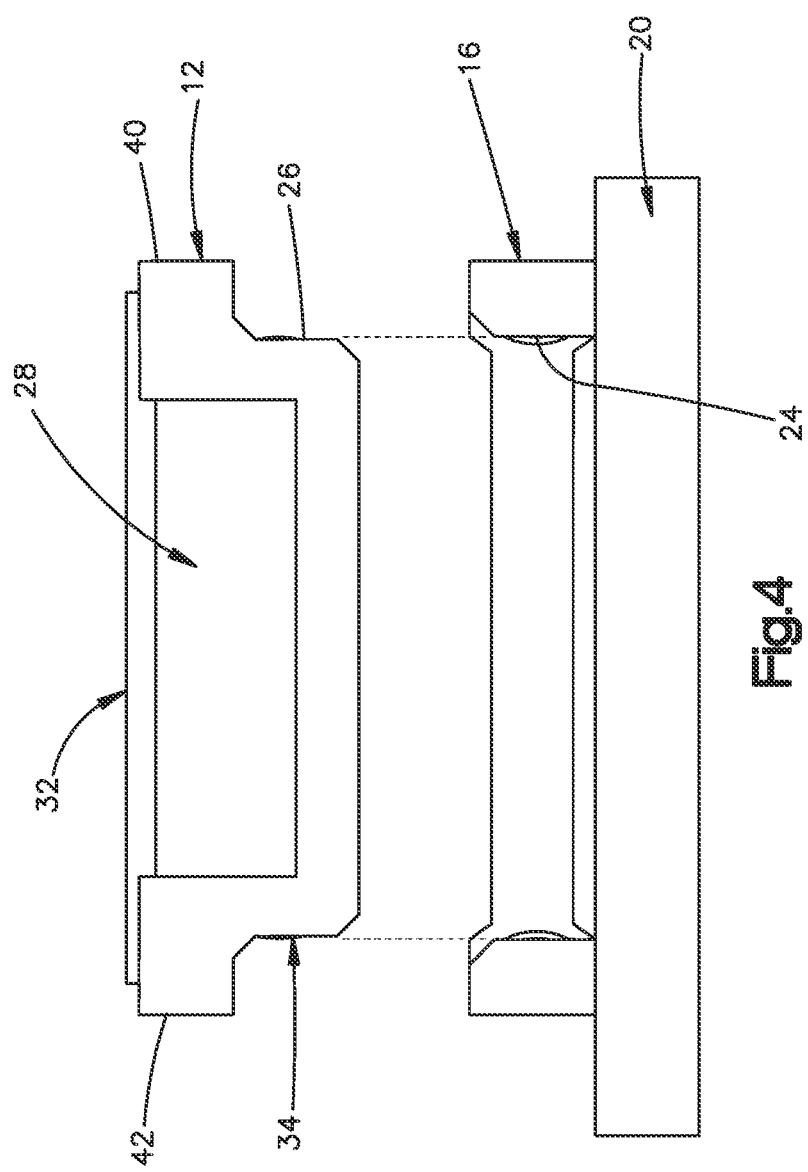

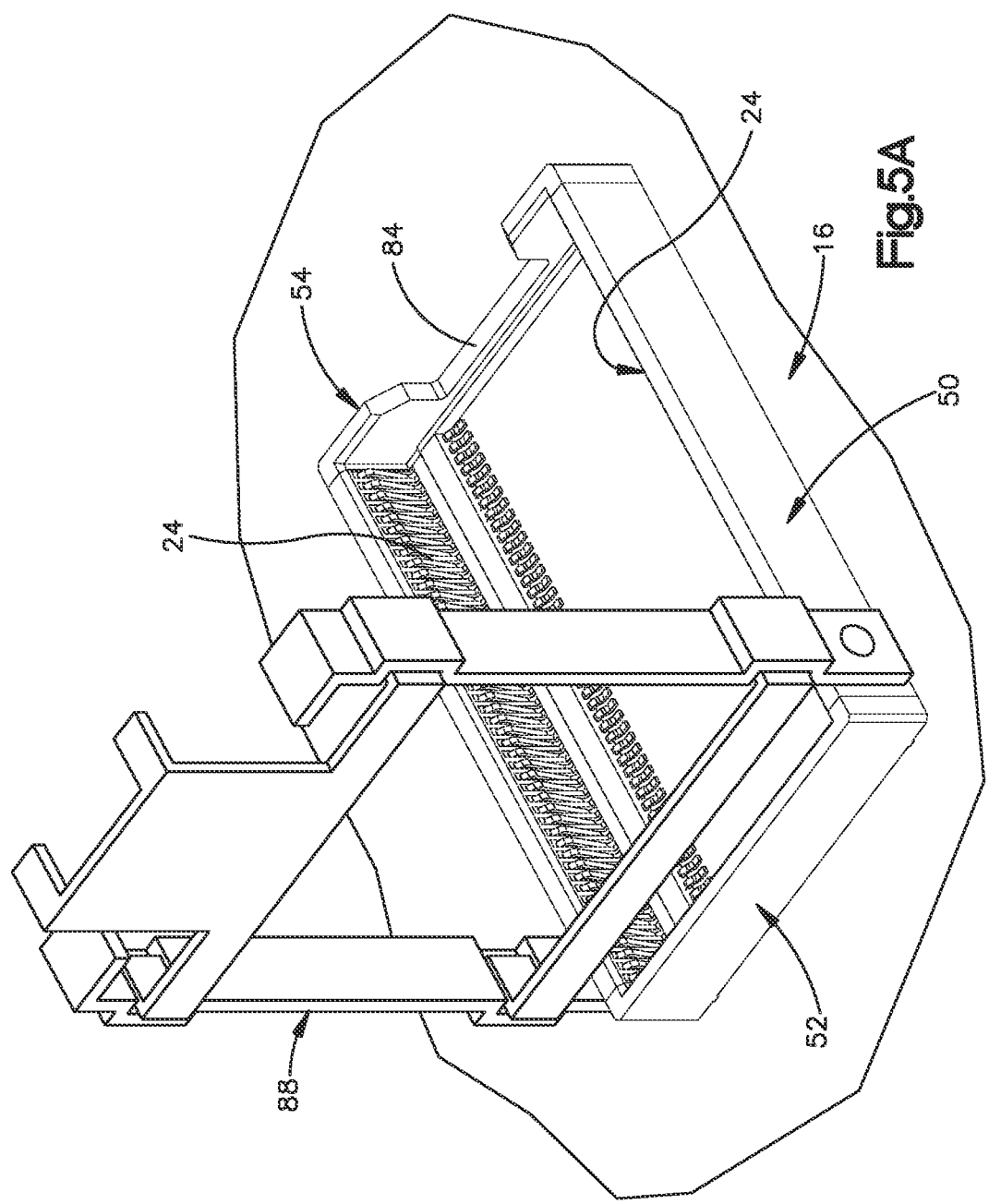

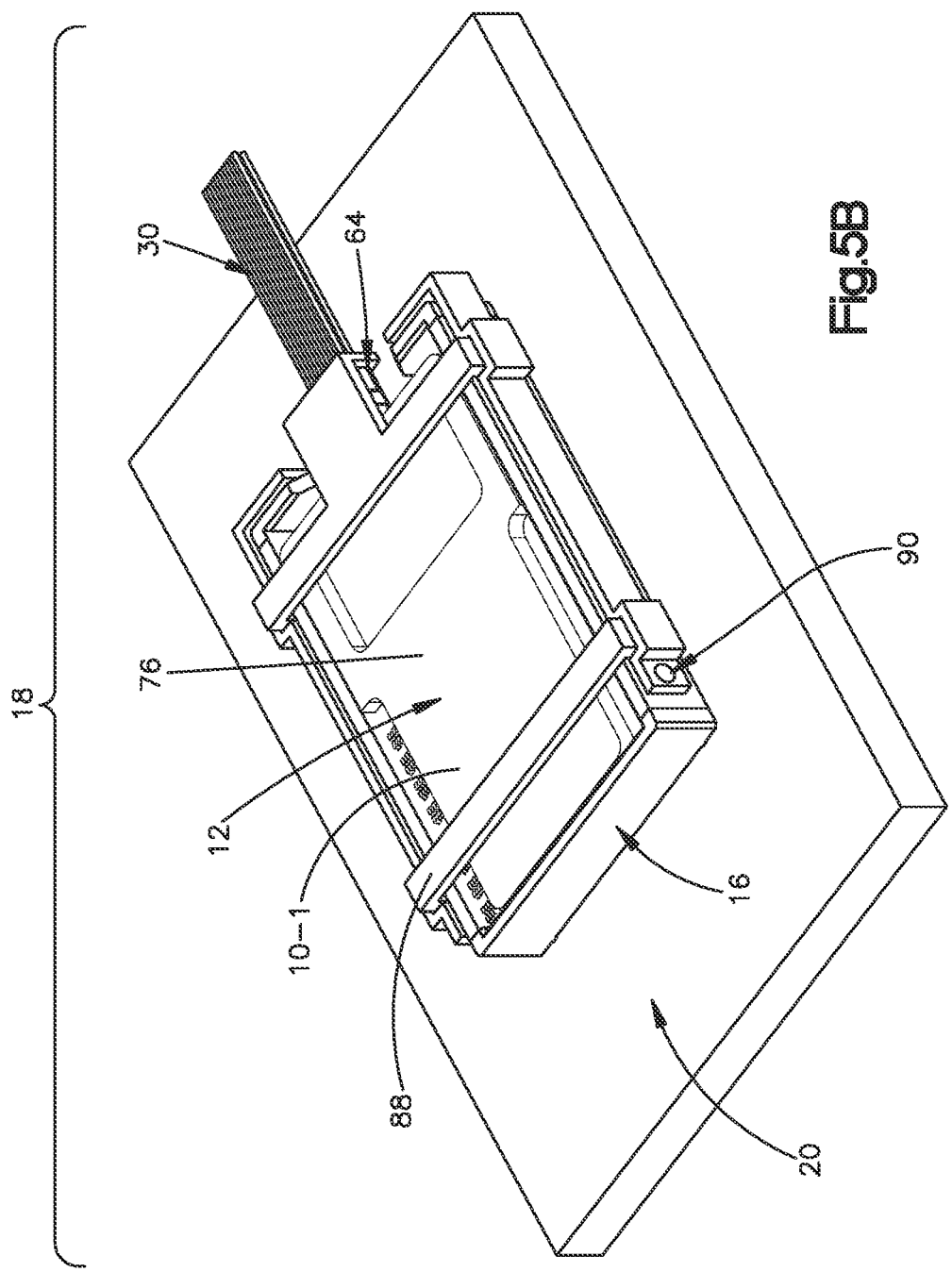

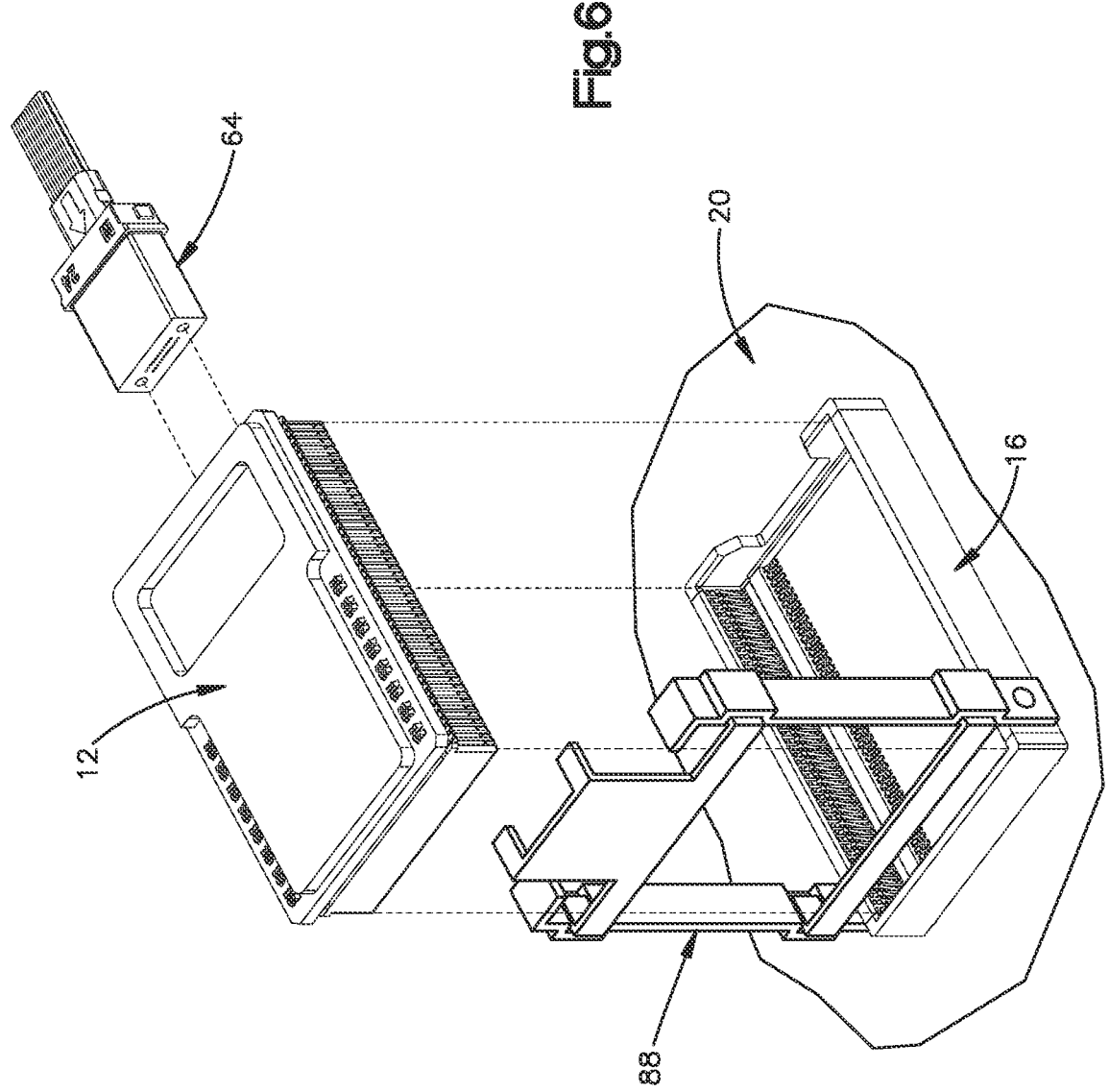

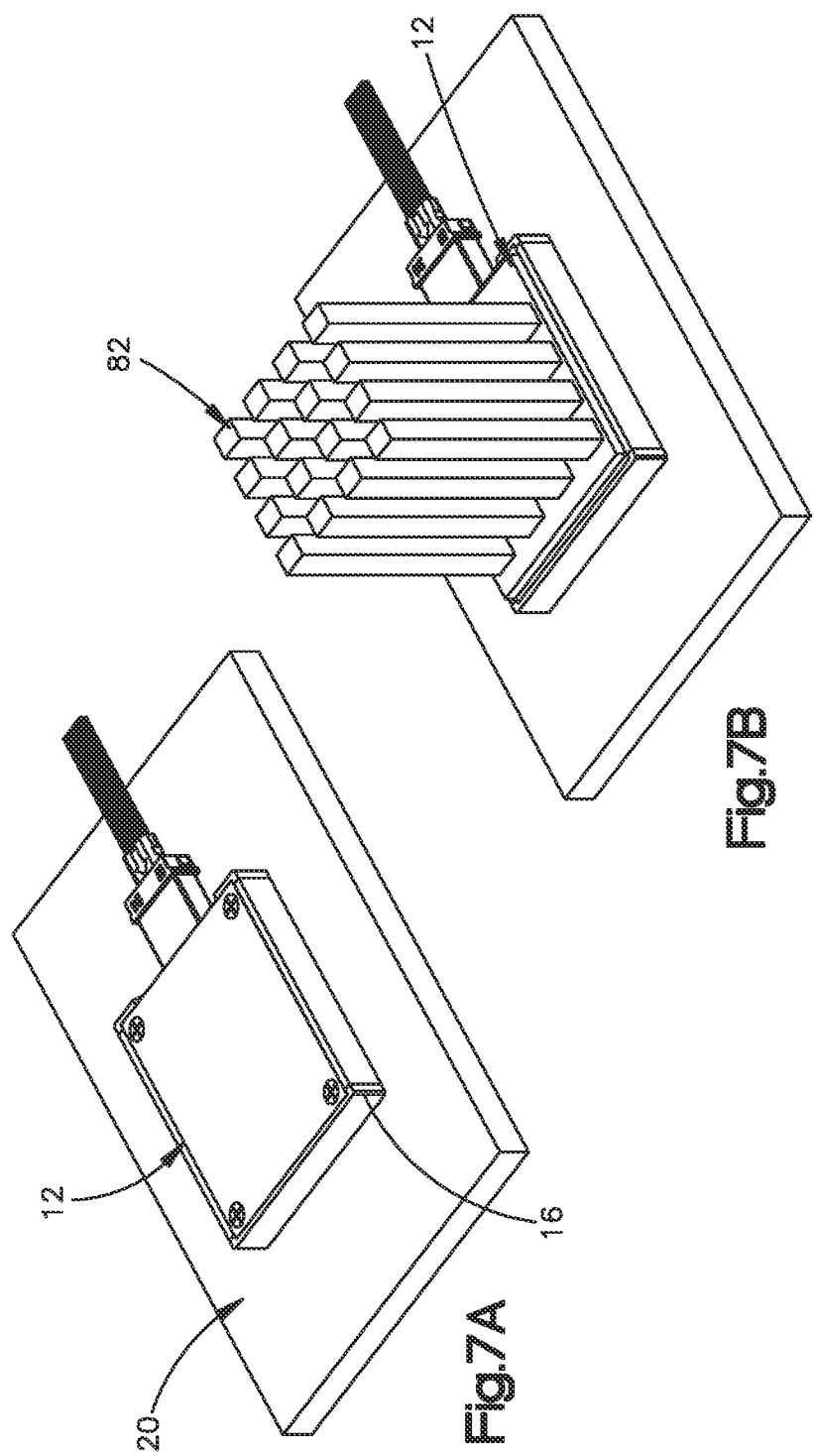

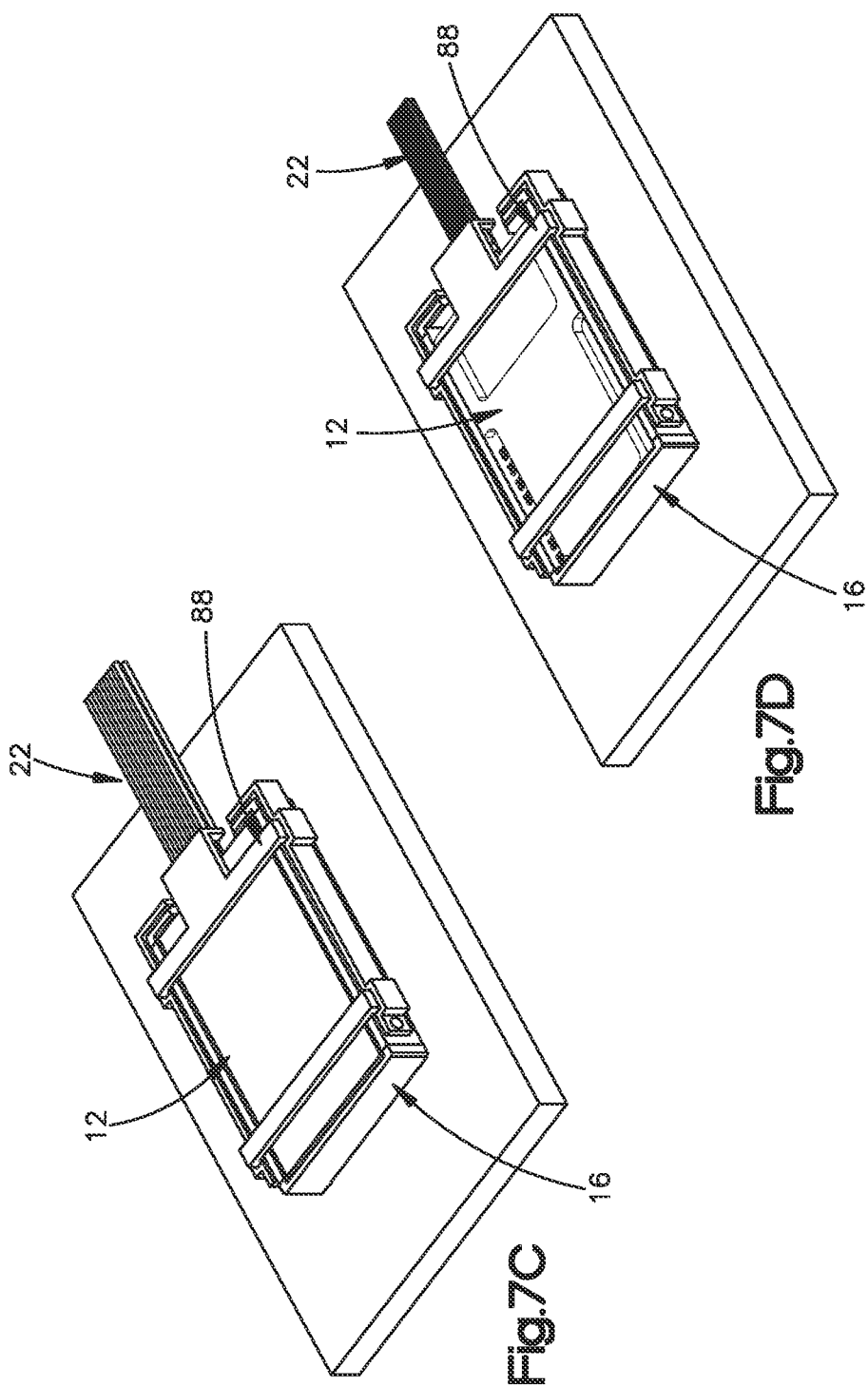

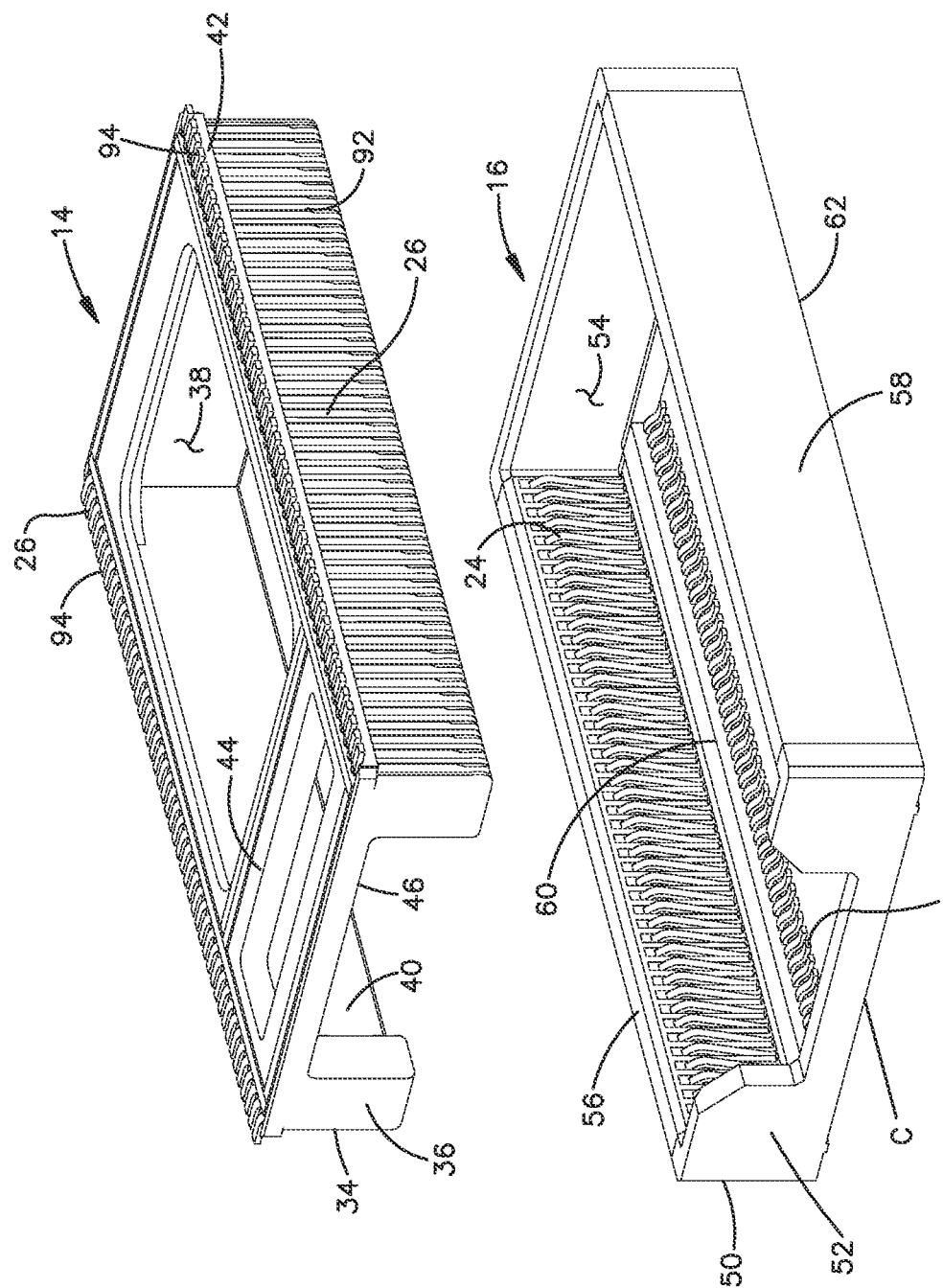

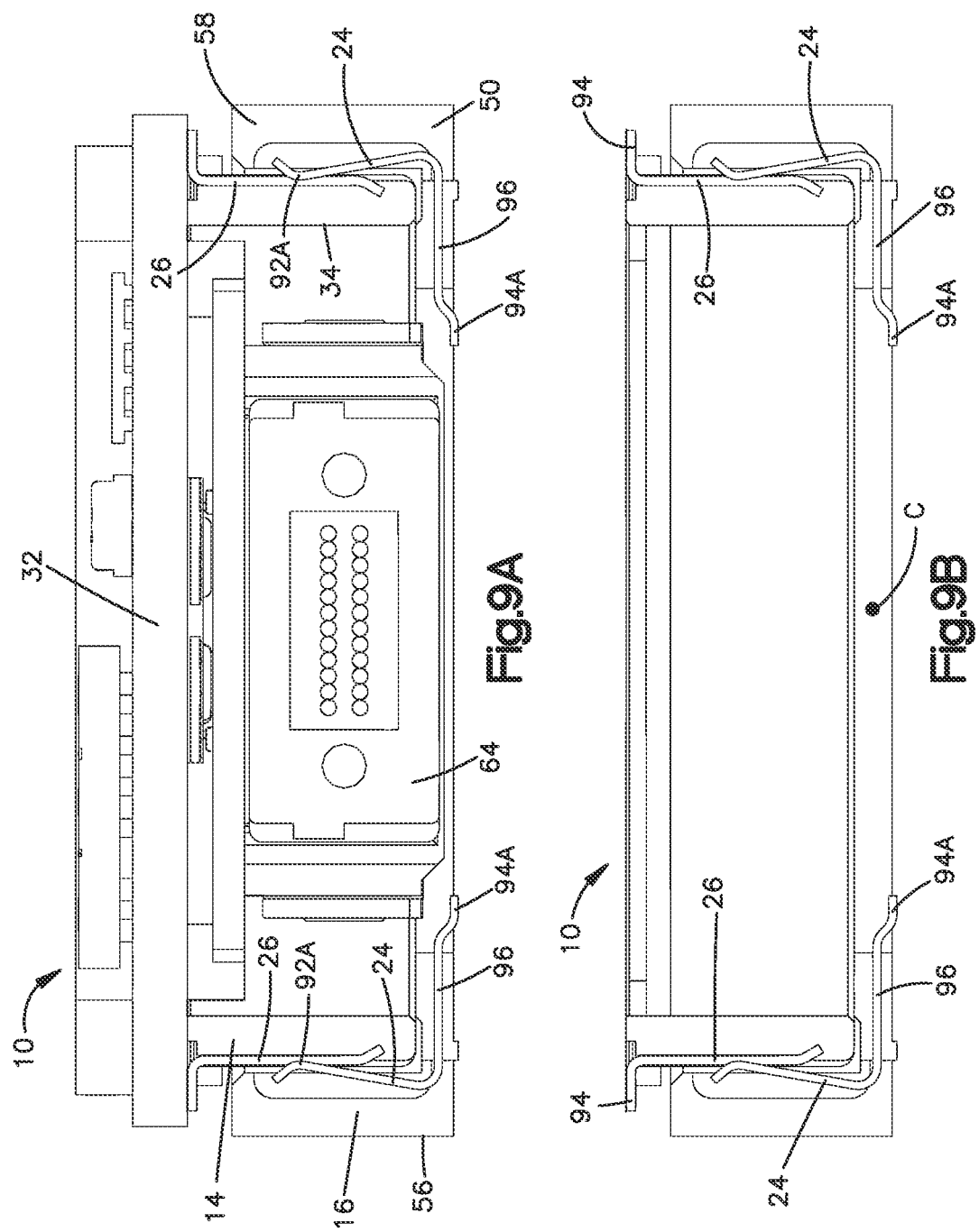

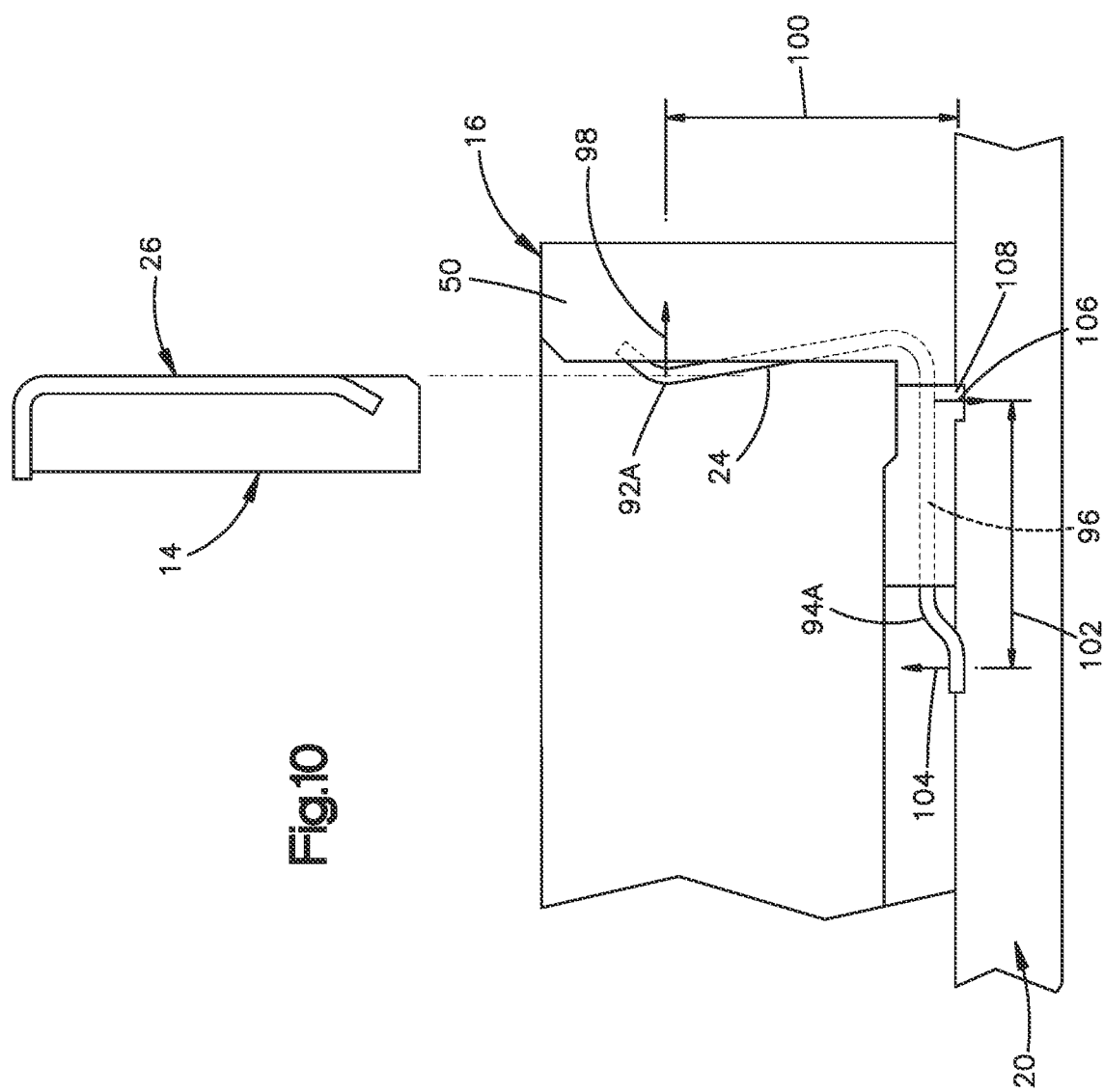

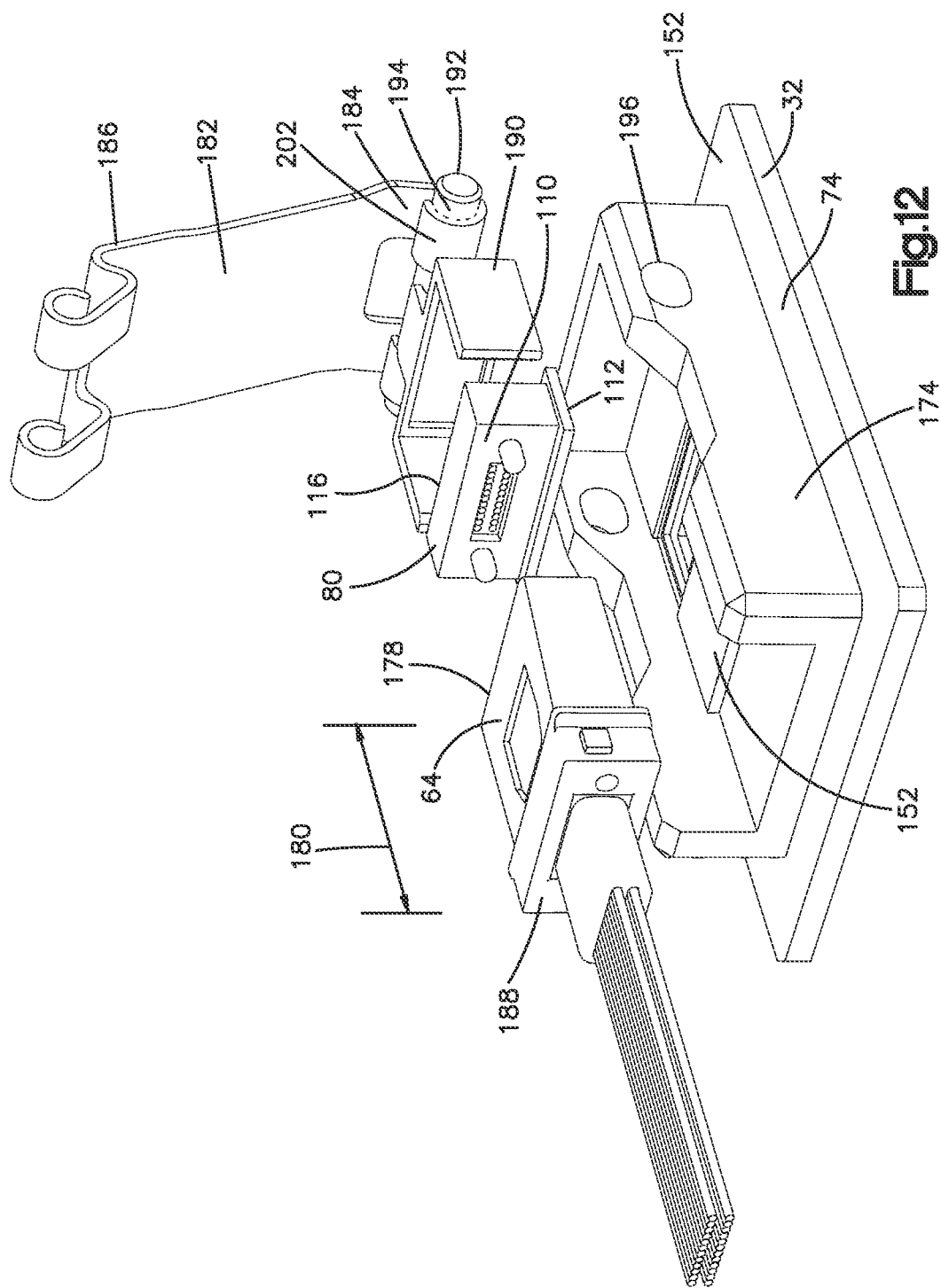

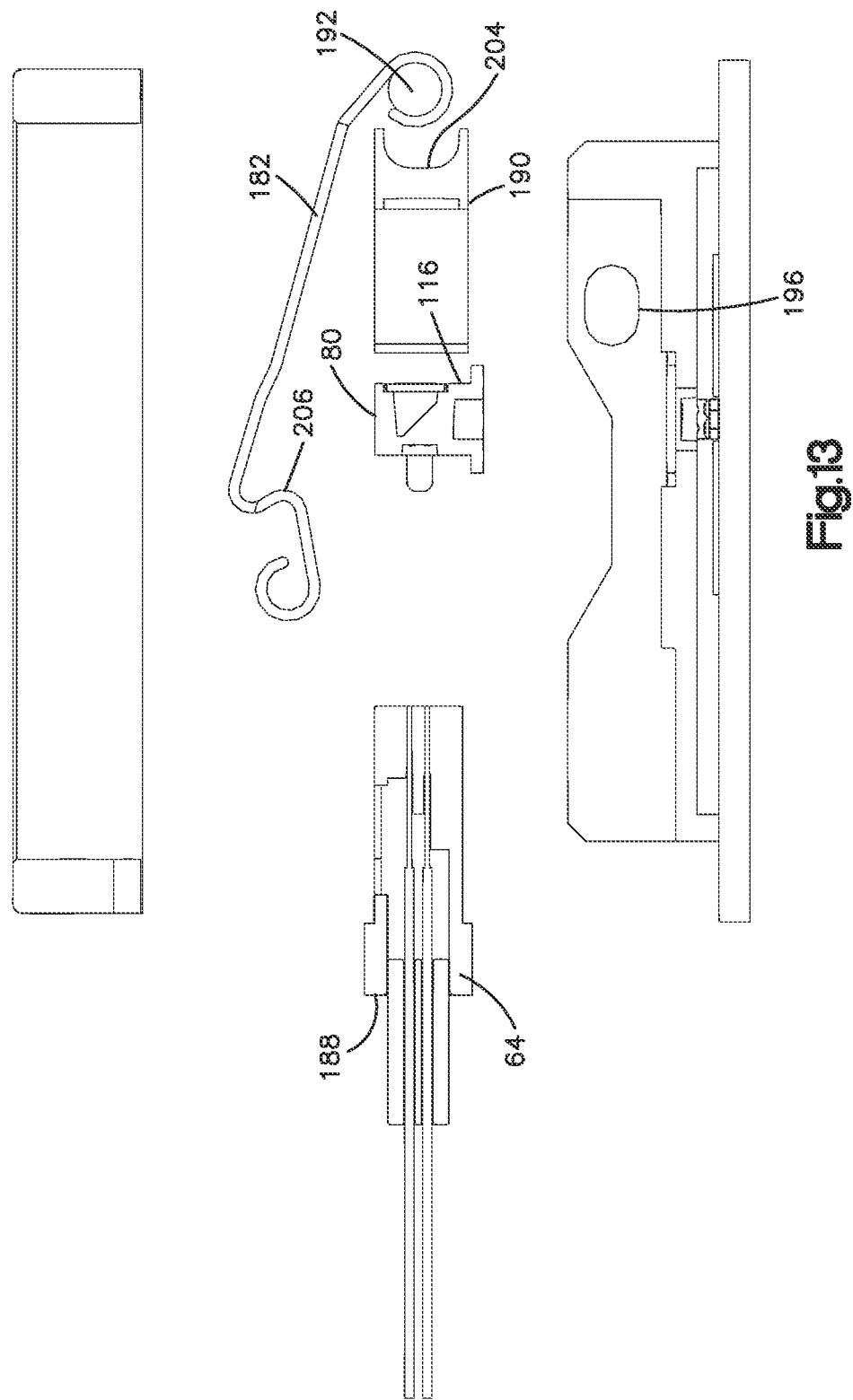

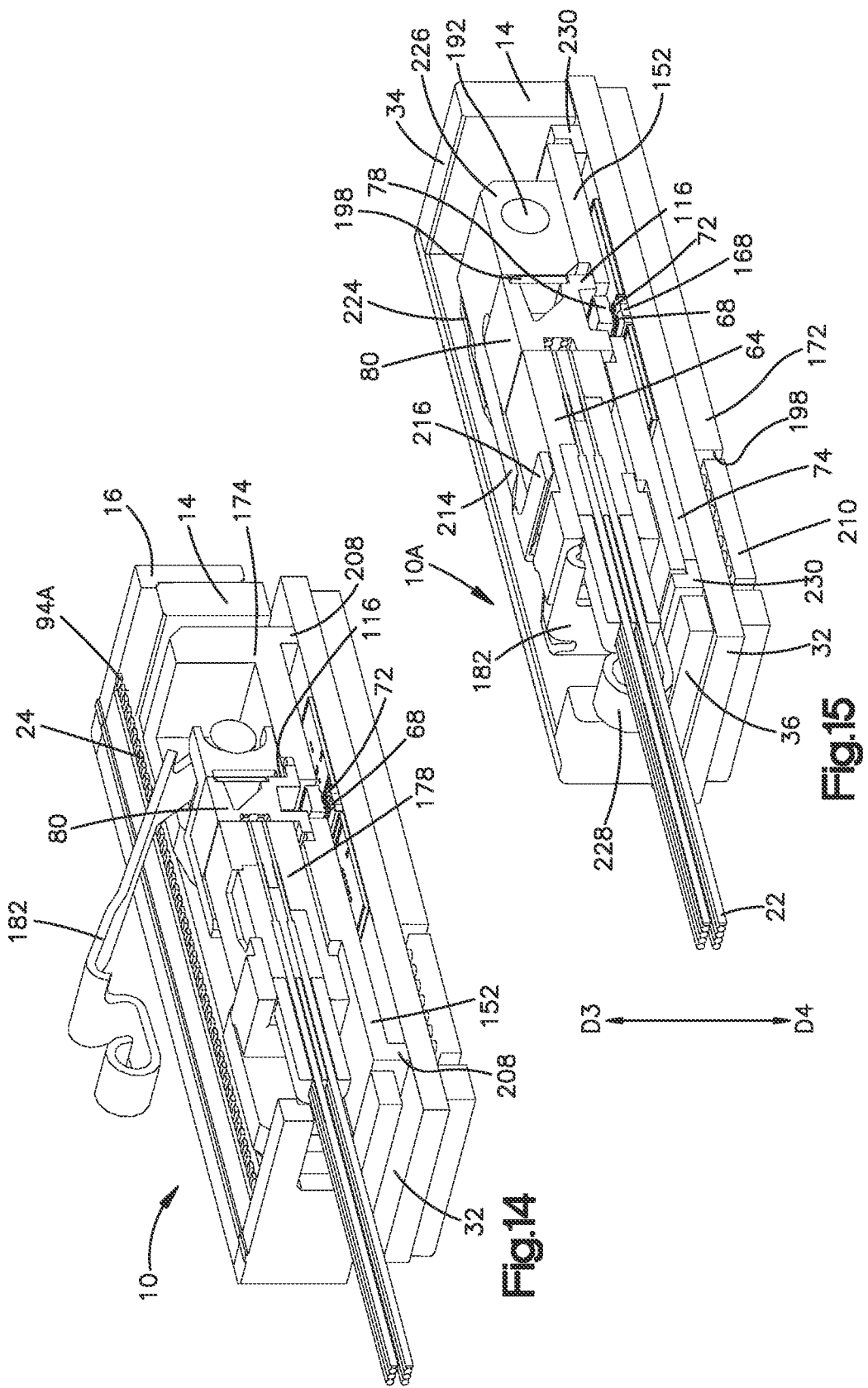

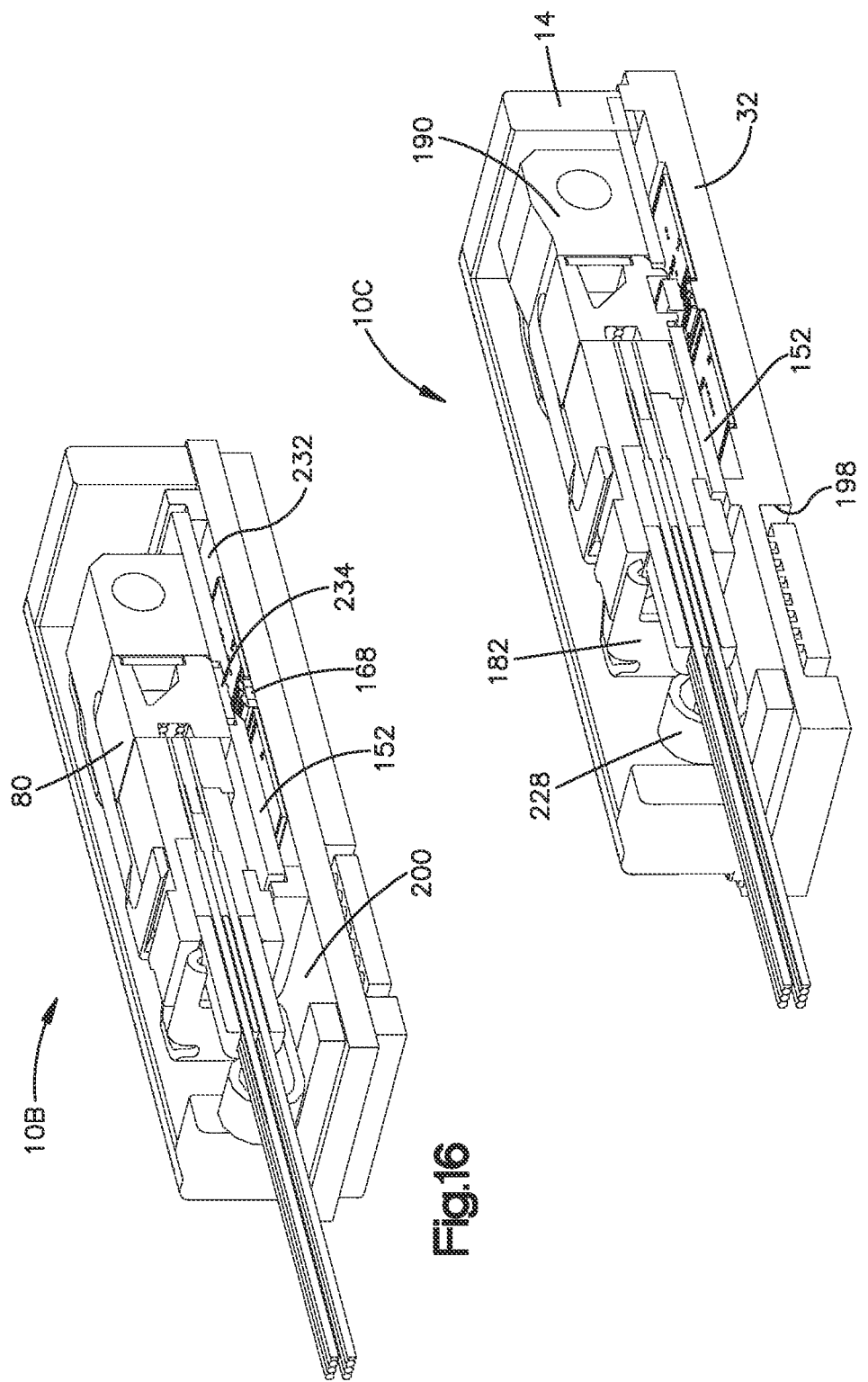

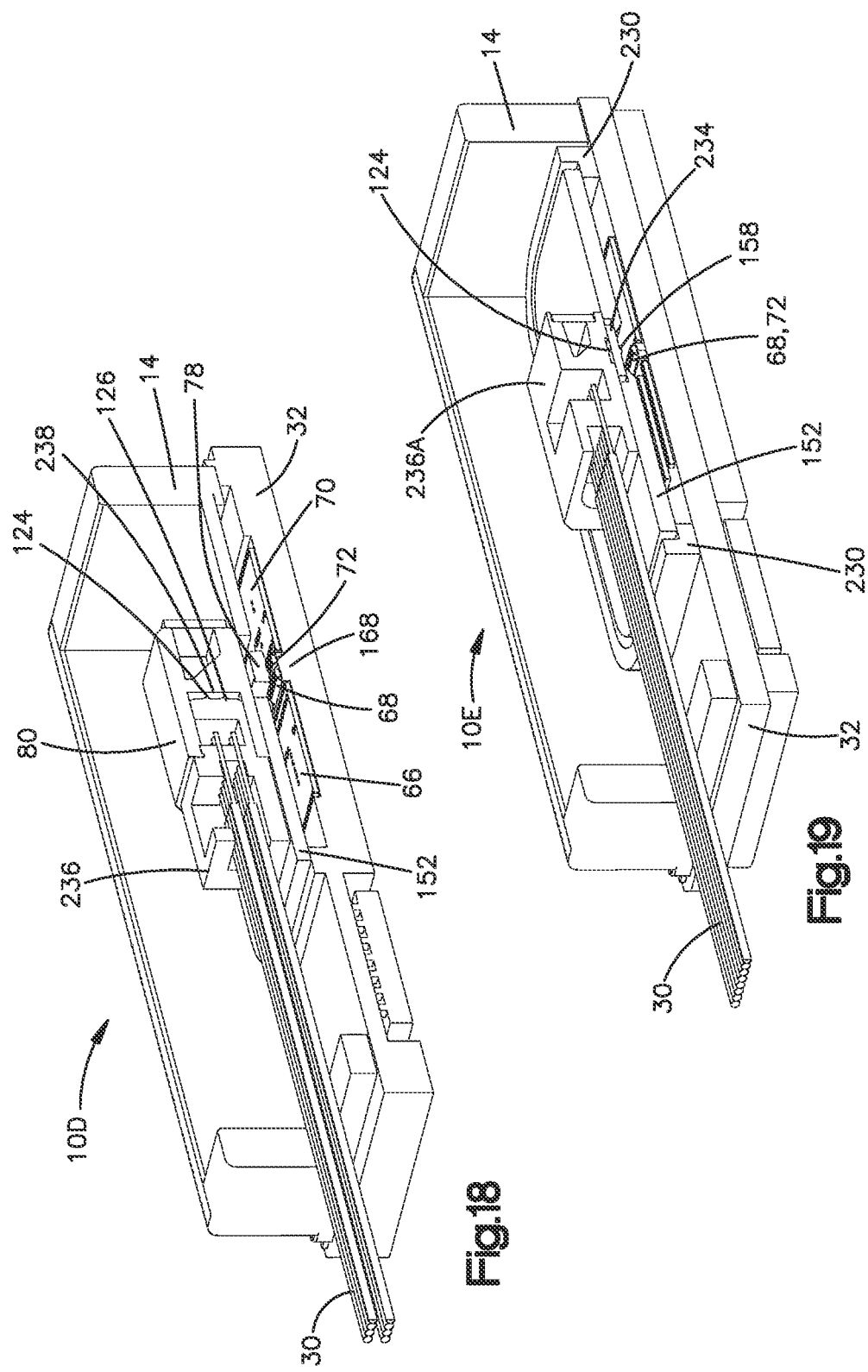

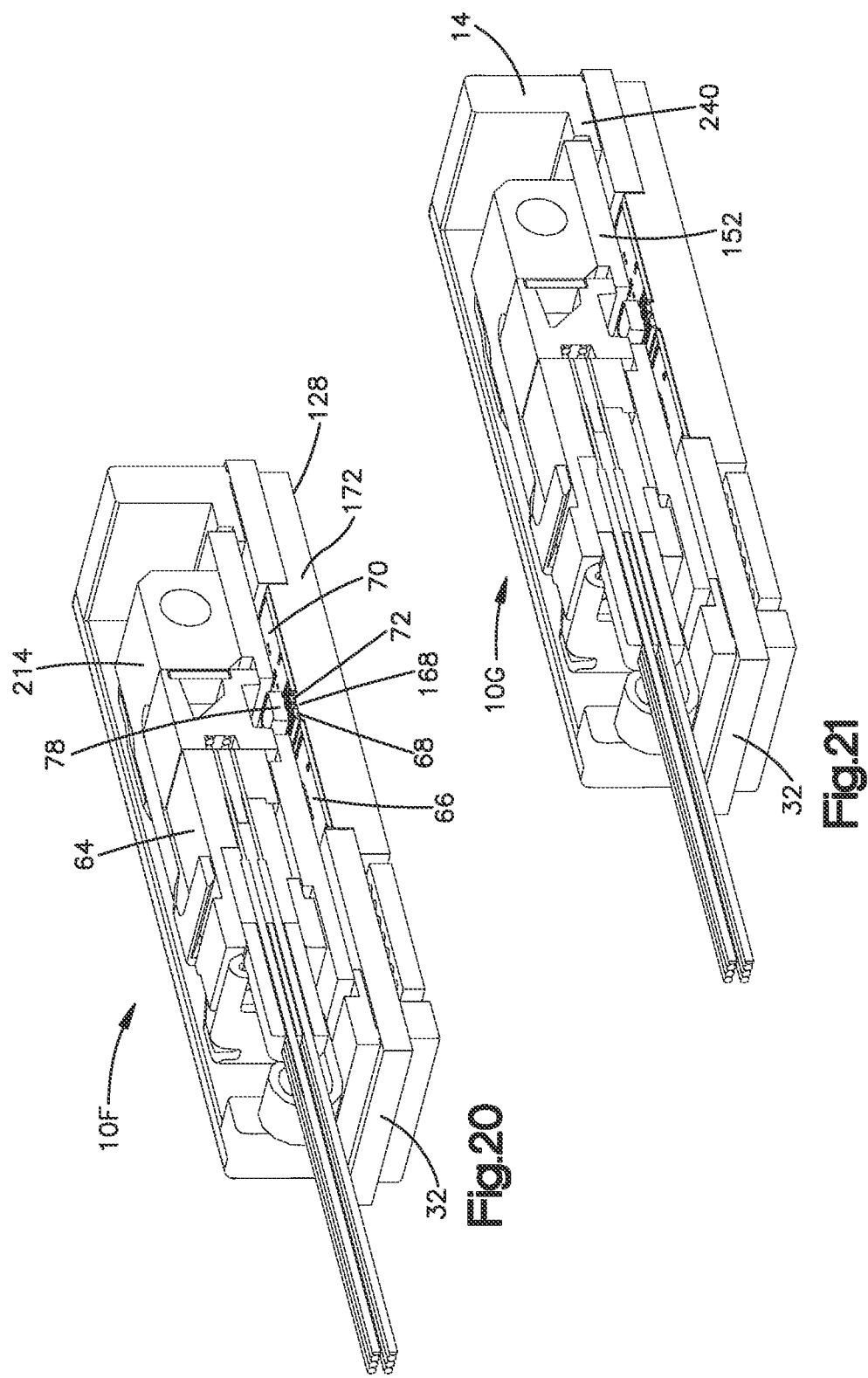

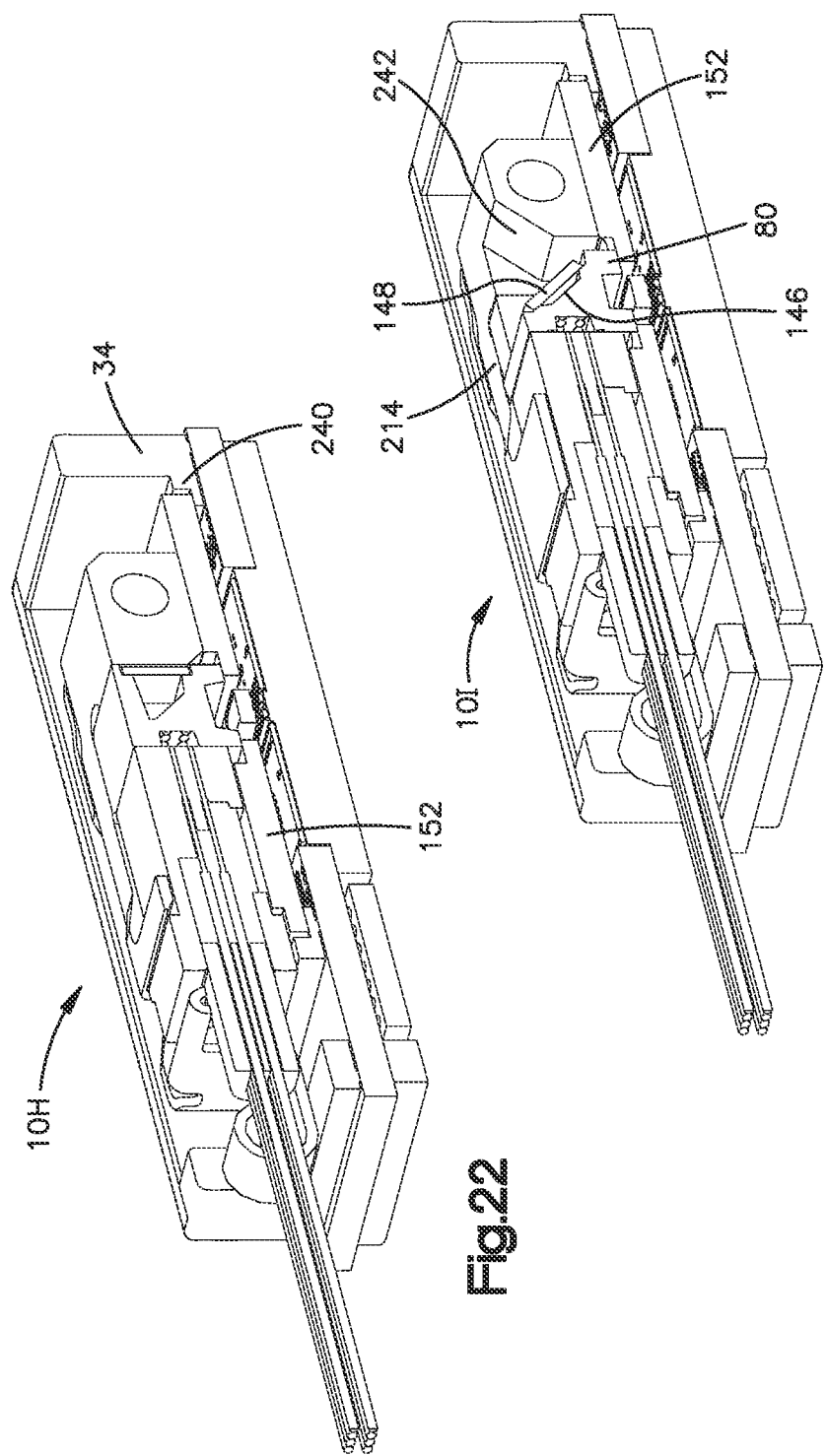

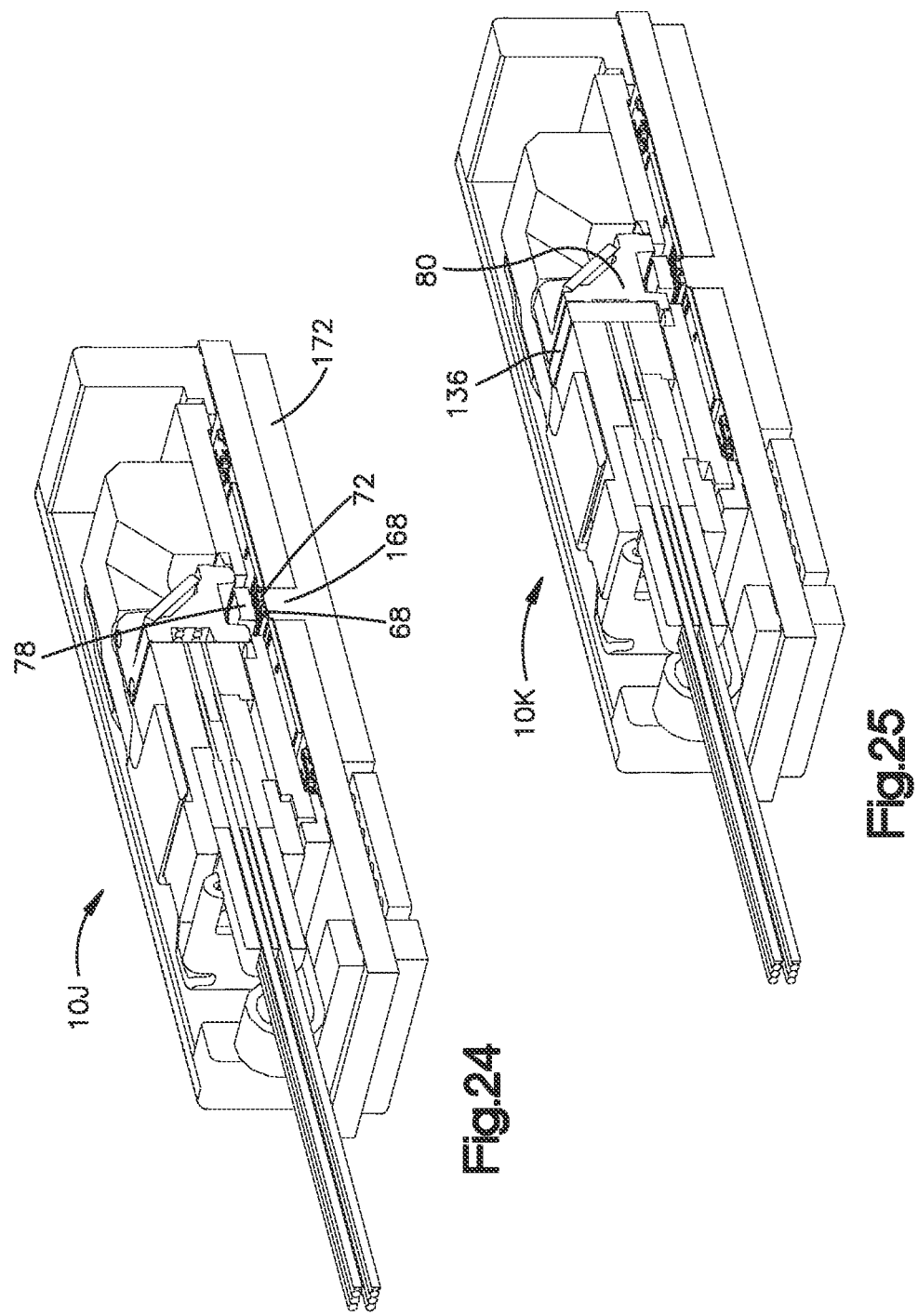

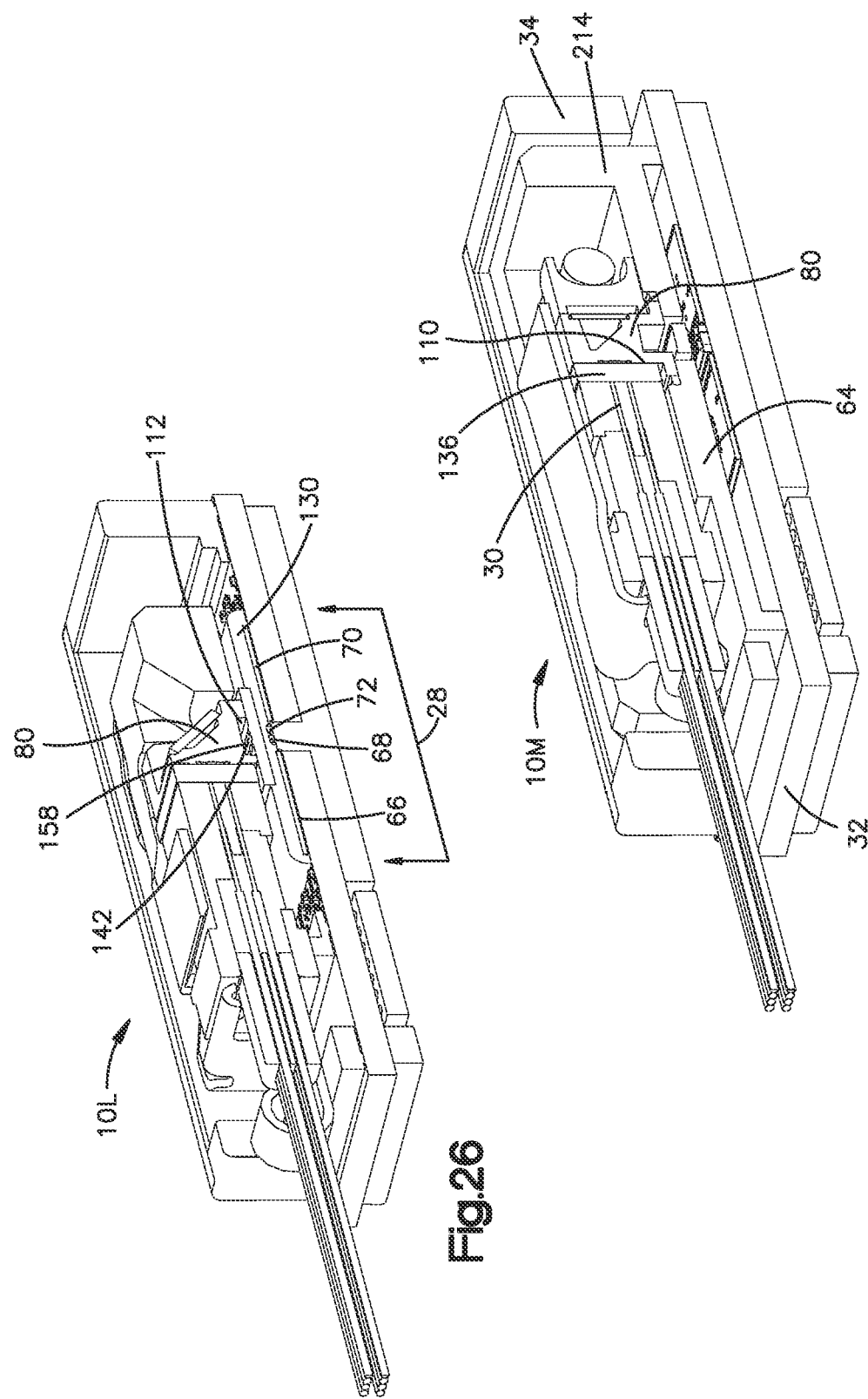

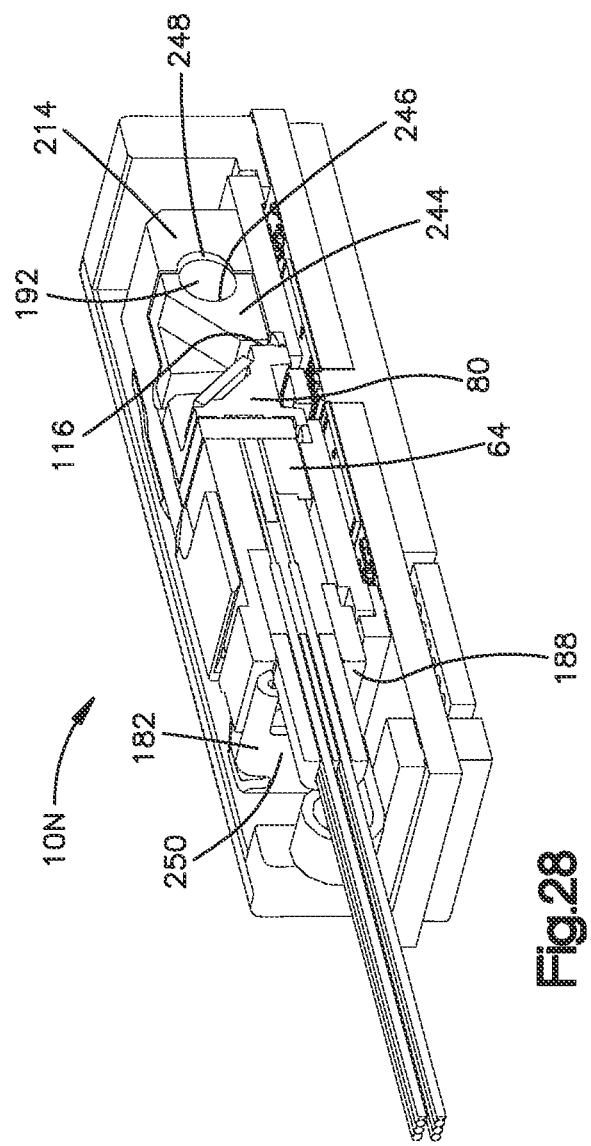

VERTICAL INSERTION INTERCONNECTION SYSTEM WITH RING CONNECTOR FOR HIGH-SPEED DATA TRANSMISSION

CROSS-REFERENCE TO RELATED APPLICATIONS

This is the National Stage Application of International Patent Application No. PCT/US2021/054749, filed Oct. 13, 2021, which claims priority to U.S. Patent Application Ser. No. 63/091,148 Filed Oct. 13, 2020, the disclosure of which is hereby incorporated by reference as if set forth in its entirety herein.

BACKGROUND

Interconnect modules are used to transmit information between two points in a communication system. The use of optical interconnect modules, instead of electrical interconnects, provides a significant gain in terms of bandwidth distance product and power dissipation reduction. Optical interconnect modules can take the form of an optical transceiver, optical transmitter, or optical receiver. Optical transceivers interface with optical fibers, one or more of which are optical receive fibers that are configured to receive optical input signals, and one or more fibers of which are optical transmit fibers that are configured to transmit optical output signals. In some cases, the optical fibers plug into the optical transceiver, whereas in other cases the optical fibers are permanently attached (commonly known as pigtailed) to the optical transceiver. Optical transceivers further include electrical contacts, one or more of which being electrical receive contacts that are configured to receive electrical input signals, and one or more of which electrical transmit contacts that are configured to transmit electrical output signals. The electrical contacts of the transceiver are configured to mate with complementary electrical contacts of an electrical device, such as an electrical connector that is, in turn, is mounted to a host substrate that can be configured as a printed circuit board (PCB).

Optical transceivers can include an optical transmitter that receives the electrical input signals and activates a light source to generate the optical output signals to the optical transmit fibers for use in a communication system. The optical output signals correspond to the received electrical input signals. The light source is typically a laser light source, such as a VCSEL (Vertical Cavity Surface Emitting Laser) or some other type of laser. The optical transmitter includes an integrated circuit (IC) die that is configured as a driver that is electrically connected to the VCSEL and modulates the driving current of the VCSEL effectively modulating its light output. Other types of light sources may be used and the light source may generate a constant output light level which is then modulated by another element in the transceiver.

Unfortunately, light source performance, such as VCSEL performance, is degraded by operating at elevated temperatures.

Depending on the type of VCSEL used, operating VCSELs at temperatures exceeding 70° C., 80° C., 85° C. or 100° C. may result in unacceptable VCSEL lifetime or electrical-to-optical conversion efficiency. Generally, the upper limit of the VCSEL operating temperature is significantly lower than the operating temperature limit of an IC, which may be situated adjacent the VCSEL. For example, the IC may have an operating temperature limit of 100° C. or 125° C. While the IC can withstand a higher operating temperature, it typically generates an order of magnitude more waste heat than the VCSEL. For example, in operation the IC may generate 2.0 W of waste heat while the VCSEL may only generate 0.1 W of waste heat.

Optical transceivers can further include an optical receiver that receives the optical input signals and converts the optical input signals to electrical output signals that correspond to the received optical input signals. The optical receiver typically includes one or more photodetectors that receive optical input signals and convert the optical input signals to electrical signals that can have current levels proportional with the quantity of optical photons per unit time received in the optical signals. The optical receiver further typically includes a current-to-voltage converter, such as a transimpedance amplifier (TIA) that amplifies and convert the electrical current signals to voltage levels that are usable in data communication systems. The TIA is typically constructed as an integrated circuit (IC) die. The optical engine can be either a transmitter, a receiver, or both. Further, the transmitter can be mechanically separate from the receiver. Alternatively, the transmitter can be mechanically integrated with the receiver. The photodetectors are often configured as photodiodes that, as with the VCSELs, are adversely affected at high operating temperatures. The light source of the transmitter and photodiode of the receiver may generally be referred to as electro-optical elements since they all are involved either with the conversion of an electrical signal to an optical signal or vice versa.

In operation, optical transceivers generate heat and thus typically are provided with heat dissipation systems. Thus, optical transceivers typically include one or more heat transport and, or dissipation members that are in thermal communication with one or more heat producing elements and transfer the heat to the periphery of the transceiver housing, which in turn is connected to a heat dissipation member or heat dissipation plate. Conventional transceiver design limits from which side or sides the heat can be removed from the transceiver, and in turn limits design options for integrating the optical transceiver into a communication system.

It would be advantageous if an optical interconnect module has a low profile and small footprint and is capable of transferring information at high data rates.

SUMMARY

An interconnect module, which can be a transceiver, is described. The interconnect module has a rectangular substrate with a housing mounted to it. The housing has four sides and two sides of the housing have a row of electrical contacts. The housing can be narrower than the substrate, or portions of the housing can be narrower than the substrate, or the substrate can be the same width, narrower or wider than the housing or a portion of the housing.

In other embodiments, a ring connector is described. The ring connector comprises two rows of electrical contacts that are mechanically connected by two linking members at each end so as to form a rectangular opening.

In other embodiments, a vertical insertion interconnection system is described. The vertical insertion interconnection system includes an interconnect module and a ring connector. The ring connector can include a first latch, such as a first latch that pivots about a boss or can be carried or anchored by the ring connector, to help secure the interconnect module, such as a transceiver, to the ring connector and a ferrule to the interconnect module when the interconnect module is mated to the ring connector and the first latch is engaged, closed, or activated. A ferrule can be attached to the interconnect module and the first latch can be engaged, closed, or activated. Alternatively, the first latch can be configured to only latch the interconnect module to the ring connector, and a second latch, that can be attached to the ring connector, the interconnect module, or the detachable optical cable, can latch the detachable optical cable to the interconnect module. Any latching described herein can be releasable latching.

An interconnect module can include a ferrule mate. The ferrule mate can define a first side, a second side, a third side, a fourth side, a first end, and a second end. The first side can include at least one first recess. The first side can define at least one first focusing lens and/or at least one collimating lens positioned in the at least one first recess. The first side can define at least one second focusing lens and/or at least one collimating lens positioned in the at least one first recess. The first side can define at least one second recess positioned adjacent to the at least one first recess or at least one second recess spaced apart from the at least one first recess. At least one spacing reference can be positioned adjacent to at least one first recess. The second side can define at least one third recess. A plate, such as an optically transparent plate, can be positioned adjacent to the first side. The optically transparent plate can be a glass plate. An optically transparent plate can be positioned adjacent to the first side and can define a first gap between the optically transparent plate and the first focusing lens or the first collimating lens. The spacing reference and the plate can create at least one second recess. An optically transparent plate can be positioned adjacent to the first side and a first seal can be positioned in the second recess between the optically transparent plate and the first side. The third side can define at least one reflection surface. The ferrule mate can be made from an optically transparent material.

The interconnect module can include a reflection surface cover plate. The reflection surface cover plate can be positioned over the at least one reflection surface. A second sealed gap can be defined between the reflection surface and the reflection surface cover plate. The reflection surface can be intentionally degraded by laser ablation. The reflection surface can be intentionally degraded by laser ablation after the reflection surface cover plate is positioned adjacent to the third surface. The reflection surface cover plate can be transparent to light.

The interconnect module can include a lid. The lid can be positioned adjacent to the second surface. The lid can define a lid cavity or through hole. The lid can define a cover plate cavity or through hole in optical communication with the at least third recess. The ferrule mate can be carried by the lid. The ferrule mate can be sealed to the lid by a ferrule mate seal.

The interconnect module can include an optical block. The optical block can be positioned in or at least partially overlapping or overhanging a boundary of the lid cavity. The optical block can be positioned in the at least one third recess or under the third recess. The optical block can be made from an optically transparent material. The optical block can include or define at least one first collimating lens and/or at least one first focusing lens. The optical block can include or define at least one second collimating lens and/or at least one second focusing lens. The optical block can include a first surface and a second surface. The optical block can include a first surface and a second surface, wherein the first surface can face the third recess in the ferrule mate. The first and second collimating and/or focusing lenses can be on the second surface of the ferrule mate. A third gap can be defined between a first surface of the optical block and second side of the ferrule mate. The third gap can be sealed by a ferrule mate seal.

The interconnect module can include at least one vertical cavity surface emitting laser (VCSEL), at least one VCSEL driver wire bonded to the VCSEL, at least one photodiode, and at least one a transimpedance amplifier (TIA) wire bonded to the photodiode. The VCSEL can be positioned adjacent to a second surface of the optical block.

The interconnect module can include a module substrate. The interconnect module can include a module substrate and a VCSEL driver carried by the module substrate. The interconnect module can include a module substrate and a TIA carried by the module substrate. The module substrate can defines a riser cavity. The interconnect module can include a riser that extends into the riser cavity. A VCSEL can be carried by the riser and the riser can dissipate unwanted heat from the VCSEL. At least one photodiode can be carried by the riser.

The interconnect module can be configured to mate with a ferrule. The ferrule can include at least one optical fiber. The at least one optical fiber can include a core. The interconnect module can be configured to receive a ferrule that carries at least one optical fiber, and a core of the at least one optical fiber can be in physical contact with the optically transparent plate when the ferrule is mated with the interconnect module.

The interconnect module can include a housing, such as an interconnect module housing and/or a static latch frame. The housing can be configured to receive a ferrule.

The interconnect module can include a latch, such as a first, second or third latch. The latch can be rotatable and can be configured to compress the ferrule and the ferrule mate together through opposed forces applied to a back of the ferrule and to the fourth side of the ferrule mate when the ferrule is mated to the transceiver and the latch is in an engaged position. The latch can be floating, yet captive, within the interconnect module. The latch can be rotatable to, but not removable from, the interconnect module housing or the static latch frame. The interconnect module can include a bushing and the latch. The bushing can be positioned adjacent to a first latch end and the fourth side of the ferrule mate. The latch can further include an axle. The axle can be configured to be received and rotatably fixed with respect to a corresponding guide hole defined by the housing.

The interconnect module can include the bushing. The bushing can abut the fourth side of the ferrule mate. The bushing can be configured to physically contact the fourth side of the ferrule mate. The bushing can define a bushing recess and the bushing recess can receive the axle. The interconnect module can include a latch, a movable or floating bushing that is moved by the latch, and a ferrule optically coupled to the first side of the ferrule mate. The movable or floating bushing can exert a force against the fourth side of the ferrule mate and the latch can exert an opposite force against the ferrule, which in turn can force a core of an optical fiber against the optically transparent plate when the latch is in a closed position. The interconnect module can include a latch, a movable or floating bushing that is moved by the latch, and a ferrule optically coupled to the first side of the ferrule mate. The movable or floating bushing can be configured to not exert a force against the fourth side of the ferrule mate. The latch can be configured to not exert an opposite force against the ferrule when the latch is in an open position. The interconnect module can be a transmitter only or a receiver only, or both a transmitter and a receiver.

interconnect module comprising an optical engine and a module connector, the module connector configured to fit inside a mating ring connector, wherein the ring connector circumscribes the module connector.

The module connector can have a portion that is wider than the ring connector. The interconnect module can include a ferrule mate, a latch, and a module substrate. An intersection between the ferrule mate and the module substrate can experience no sheer stress when the latch is closed. An optical engine can be configured to fit inside the module connector and the module connector can circumscribe the optical engine.

An electrical connector can include a housing and at least two linear arrays of electrically conductive contacts. Each of the electrically conductive contacts can have a respective first contact end, a respective second contact end, and a respective horizontal section. Respective second contact ends in a third linear array of the at least two linear arrays of electrically conductive contacts and the respective second contact ends in a fourth linear array of the at least two linear arrays of electrically conductive contacts can be mirror images of one another about a common centerline. Respective horizontal sections of at least three sequential electrical contacts can each be retained in an electrically non-conductive material, each can extend toward the common centerline, and each can be positioned orthogonal to the centerline. The respective second contact ends in the third linear array of electrically conductive contacts and the respective second contact ends in the fourth linear array of electrically conductive contacts can all extend in a direction toward a common centerline. The electrically conductive contact can be ring contacts. Each ring contact can be bent upward about ninety degrees and can be configured to mate with a corresponding module contact. The housing can be a ring connector housing and can be configured to only make contact with a host substrate at a location substantially opposite respective attachment ends of the respective second contact ends, such as at a protrusion defined by the ring connector housing. A respective contact force on a respective electrically conductive contact height above a host substrate and a reaction force baseline distance measured between an attachment point of a respective second contact end and a protrusion on the ring connector housing can define a solder joint pull force and a reaction force. The length of the reaction force baseline can be modified such that the solder joint pull force is within a predetermined range to ensure a reliable solder joint. The respective electrical conductors can each define a J-shape or L-shape beam geometry and can each have a free beam length substantially equal to or longer than the contact height above the PCB distance.

A system can include a ring connector and mating interconnect module, such as a transceiver. The interconnect module can mate orthogonally with the ring connector, with a mated stack height of approximately 2.8 mm to approximately 7 mm, approximately 2.8 mm to approximately 6 mm, approximately 2.8 mm to approximately 5 mm, or approximately 2.8 mm to approximately 4 mm.

An interconnect module can be configured to receive a non-MT custom ferrule. The custom ferrule can have a housing height less than a height of a MT ferrule. The custom ferrule can have a smaller housing width than a MT ferrule. The custom ferrule can have a length that is smaller than a MT ferrule. The custom ferrule can have first and second lenses located on the custom ferrule instead of a ferrule mate. Each of the first lenses and the second lenses can be fixed with respect to their respective optical waveguide or optical fiber. An interface between the custom ferrule and a ferrule mate can be easily sealed. The custom ferrule can be permanently attached to a ferrule mate. The custom ferrule can be repeatably separable from a ferrule mate. A distance between adjacent, parallel centerlines of rows or linear arrays of optical waveguides or optical fibers can be reduced in distance. A waveguide array that can include active areas of photodiode and VCSEL arrays or centers of the photodiode and VCSEL arrays, and corresponding optical beams aligned in a single row, along a common straight line or parallel to a common straight line. Eight channels can be carried by a 1×8 array of optical fibers or by a 1×12 array of optical fibers with four unused or dark optical fibers. Sixteen channels can be carried by a 2×12 array of optical fibers with eight unused or dark optical fibers. Sixteen channels can be carried by a 1×16 array of optical fibers with no unused or dark optical fibers.

An interconnect module can include a module connector housing and a lid supported by at least a portion of the module connector housing. At least a portion of the module connector housing can be a ledge. The interconnect module can include an interconnect module housing carried by the module substrate. The interconnect module can include a latch that is rotatable but non-removable from the interconnect module housing.

An interconnect module can include a heat spreader that defines a heat spreader cavity. The heat spreader cavity can be configured to receive electrical components, optical components, or both.

An interconnect module can include a ferrule mate. The ferrule mate can define an angled or sloped reflection surface. A static latch frame can define an angled or sloped latch frame surface that can help prevent clipping of a laser beam used to intentionally, selectively and partially defeat the reflection surface. The angled or sloped surface of the static latch frame and the angled or sloped reflection surface can each lie in a corresponding one of two converging planes. A reflection position cover plate can be positioned over the angled or sloped reflection surface and angled on the ferrule mate, such as at a forty-five degrees angle with respect to a lid.

A method can include the following steps, in order: providing a reflection surface, positioning a reflection position cover plate over the reflection surface and intentionally defeating the reflection surface with an ablator, such as a laser.

An interconnect module assembly can include a ring connector configured to be mounted to a host substrate and an interconnect module configured to be orthogonally mated to the ring connector. A portion of the interconnect module can fit within a perimeter of the ring connector and another portion can hang over or be positioned over the first ring side, the second ring side or both.

An interconnect module can include a module substrate, a module connector housing attached to the module substrate, a latch attached to the module connector housing, and a heat spreader attached to the module substrate. The heat spreader can define a heat spreader cavity that is configured to receive optical or electrical components.

An interconnect module can include a lid, a static latch frame attached to the lid, a latch attached to the static latch frame, a module substrate attached to the lid and a heat spreader attached to the module substrate. The heat spreader can define a heat spreader cavity that is configured to receive optical or electrical components.

The heat spreader can define a riser. One or more or at least one of a TIA, photodiode, VCSEL driver and VCSEL can be positioned on the riser. A non-MT ferrule can be attached to the lid. The lid can include an optical block plate. A ferrule mate can be attached to the lid.

BRIEF DESCRIPTION OF DRAWINGS

The following detailed description will be better understood when read in conjunction with the appended drawings, in which there is shown in the drawings example embodiments for the purposes of illustration. It should be understood, however, that the present disclosure is not limited to the precise arrangements and instrumentalities shown. In the drawings:

FIGS. 1A-IC are schematic views of interconnect modules having different arrangements of electrical contacts;

FIG. 2A is an embodiment of an optical transceiver and a ring connector with a pluggable optical waveguide with the pluggable optical waveguide detached;

FIG. 2B is an embodiment of an optical transceiver and a ring connector with an attached pluggable optical waveguide;

FIG. 3 is a perspective view of a transceiver with a partially cross-sectioned housing and the optical engine is exposed;

FIG. 4 shows a cross-section views of an assembled module connector housing and module substrate cross section forming a T shape and the U-shaped cradle around the leg of the T;

FIG. 5A shows a perspective view of a ring connector mounted to a host substrate, with the first latch omitted for clarity;

FIG. 5B shows a perspective view of a transceiver inserted in ring connector mounted to a host substrate;

FIG. 6 is an exploded view of a transceiver with a detachable optical cable and a ring connector;

FIGS. 7A-7D show various mounting arrangements of interconnect modules described in this invention.

FIG. 8 is a perspective, exploded, view of a ring connector and a mating module connector.

FIG. 9A is a cross-sectional end view of a transceiver and corresponding transceiver mated with a ring connector;

FIG. 9B is a cross-sectional end view of a module connector mated with a ring connector FIG. 10 is an end view of half of a ring connector;

FIG. 12 is an exploded, view of a transceiver without a module connector;

FIG. 13 is an exploded cross-sectional side view of the transceiver shown in FIG. 12;

FIG. 14 is a cross-sectional, top view of a first transceiver assembly with the transceiver shown in FIGS. 12 and 13;

FIG. 15 is a cross-sectional, top view of a second module connector;

FIG. 16 is a cross-sectional, perspective view of a third module connector;

FIG. 17 is a cross-sectional, perspective view of a fourth module connector;

FIG. 18 is a cross-sectional, perspective view of a fifth module connector;

FIG. 19 is a cross-sectional, perspective view of a sixth module connector;

FIG. 20 is a cross-sectional, perspective view of a seventh module connector;

FIG. 21 is a cross-sectional, perspective view of an eighth module connector;

FIG. 22 is a cross-sectional, perspective view of a ninth module connector;

FIG. 23 is a cross-sectional, perspective view of a tenth module connector;

FIG. 24 is a cross-sectional, perspective view of an eleventh module connector;

FIG. 25 is a cross-sectional, perspective view of a twelfth module connector;

FIG. 26 is a cross-sectional, perspective view of a thirteenth module connector;

FIG. 27 is a cross-sectional, perspective view of a fourteenth module connector; and FIG. 28 is a cross-sectional, perspective view of a fifteenth module connector.

DETAILED DESCRIPTION

Figure 11:
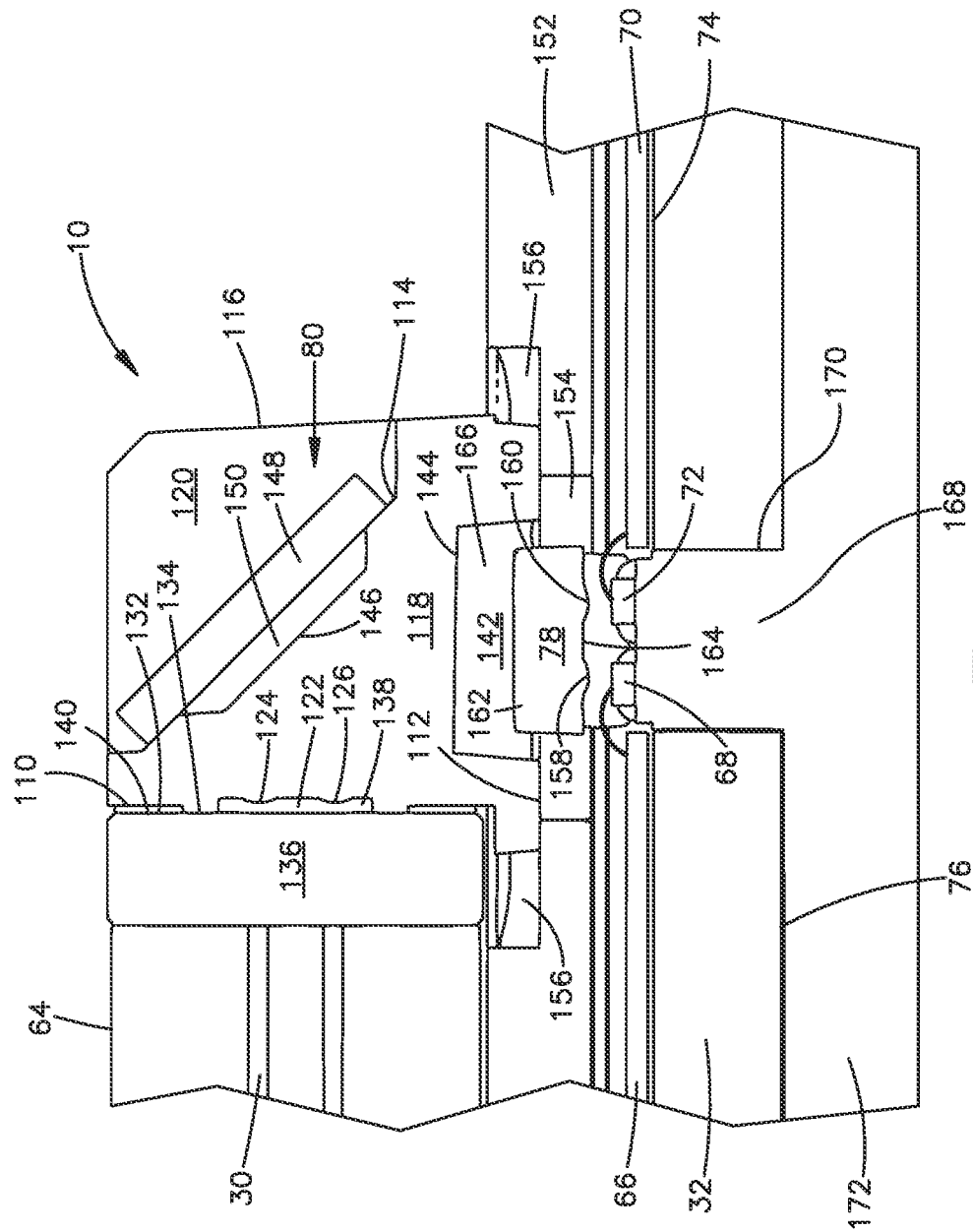
FIG. 11 is a cross-sectional side view of an optical engine.

FIG. 1A schematically illustrates an interconnect module 10-1, such as transceiver 12. Electrically conductive module contacts 26 can be positioned on opposite sides of the transceiver 12, such as first and second module connector sides 40, 42.

FIG. 1B schematically illustrates an interconnect module 10-2 or transceiver 12A with electrically conductive module contacts 26 on two adjacent sides of the transceiver 12A, such as the second module end 38 and first module side 40 or the second module end 38 and the second module side 42.

FIG. 1C schematically illustrates an interconnect module 10-3 or transceiver 12B with electrically conductive module contacts 26 on three adjacent sides of the transceiver 12B, such as the second module end 38, the first module side 40 and the second module side 42. All the embodiments shown in FIGS. 1A-C can have all the electrically conductive module contacts 26 located around the perimeter of the interconnect module 10-1, 10-2, 10-3 or transceiver 12, 12A, 12B. Electrically conductive module contacts 26 second module end 38 can be low-speed, power, control, etc.

From this point forward in the Detail Description, the disclosure related to any one or more of interconnect modules 10-1, 10-2, 10-3 discussed above and the interconnect modules 10, 10A through 10N discussed below can apply to one, any two, or all of the interconnect modules 10-1 to 10-3, 10, and 10A to 10N. For clarity, an interconnect module 10-1 to 10-3, 10, and 10A through 10N can include a transceiver 12, such as an electrical transceiver or an optical transceiver. Interconnect modules 10-1 to 10-3, 10 and 10A through 10N may be a receiver, with no transmit functionality, or a transmitter, with no receive functionality.

As shown in FIGS. 2A and 2B, the interconnect module 10-1 can be a transceiver 12, such as an electrical transceiver or an optical transceiver. The interconnect module 10-1 or transceiver 12 can include a module connector 14 that is configured to mate with a ring connector 16 to form an interconnect module assembly 18 for high-speed data transmission. The interconnect module 10-1 can be arranged to vertically mate with the ring connector 16, in the illustrated Z-direction. The ring connector 16 may be mounted to a host substrate 20, such as a host printed circuit board. The interconnect module 10-1 may be configured as a transceiver 12, transmitter, or receiver that transmits and/or receives signals from a cable and directs the signals from and/or to the host substrate 20. A signal connection between the interconnect module 10-1 and a corresponding receptacle, such as ring connector 16, can be electrical in nature and can established by mating at least one electrically conductive contact, such as a ring contact 24, in the ring connector 16 with at least one corresponding electrically conductive contact, such as a module contact 26, in the interconnect module 10-1. The connection can be established by inserting the interconnect module 10-1, such as the electrical transceiver or optical transceiver, in a substantially downward Z-direction into the ring connector 16, the host substrate 20, or both. Contact forces between one or more of the module contacts 26 of the interconnect module 10-1 or the module connector 14 and respective, corresponding one or more of the ring contacts 24 of the ring connector 16 may be substantially normal to a vertical mating or Z-direction direction between the interconnect module 10-1 and ring connector 16, such as in the illustrated Y-direction. Downward is defined herein as a direction perpendicular to and towards a major surface M of the host substrate 20 to which the ring connector 16 is mounted. Any portion or portions of the module connector 14 can be made from metal or plastic.

The interconnect module 10-1 may have an optical engine 28 (FIG. 26)) that can perform an optical-to-electrical and/or electrical-to-optical conversion and may be referred to as an optical-type of interconnect module 10-1. The interconnect module 10-1 may alternatively have no optical-to-electrical or electrical-to-optical conversion capability and may be referred to as an electrical-type interconnect module 10-1. The electrical-type interconnect module 10-1 may have only passive components (i.e. capacitors, resistors, etc.) or may contain a mixture of active (i.e. transistors, integrated circuits, etc.) and passive components.

As shown in FIG. 2B, a cable 22 can include at least one optical waveguide, such as an optical fiber 30 or a plurality of optical fibers 30, carried by an optical connector 64, such as a ferrule. The cable 22 in the electrical interconnect module 10-1 can include at least one electrically conductive wire. In some embodiments, the cable 22 in the optical interconnect module 10-1 may include both an optical waveguide, that can be an optical fiber 30, and an electrically conductive wire. The waveguide(s) can be permanently attached to the transceiver 12 or arranged to mate to the transceiver 12 through an optical connector 64. The optical connector 64 can be an MT ferrule, PRIZM MT™, MPO, LC, SC connector or other type of connectors.

Referring back to both FIGS. 2A and 2B, the ring connector 16 may be attached to a host substrate 20. The ring connector 16 can define a ring connector housing 50 that can define a first ring end 52, a second ring end 54, a third ring side 56 and a fourth ring side 58. The third and fourth ring sides 56, 58 can each carry respective rows, columns, or linear arrays of electrically conductive ring contacts 24. Each respective row of ring contacts 24 can be arranged to be parallel to each other and can each be configured to mate with a corresponding row of module contacts 26 of the interconnector module 10-1, transceiver 12 or module connector 14 when the transceiver 12 is mated with the ring connector 16. Ring connector mechanical members, such as the first and second ring ends 52, 54 may link the first and second ring sides 56, 58 of the ring connector 16 together forming a ring shaped ring connector housing 50.

The two rows of electrically conductive module contacts 26 can be located along respective long sides of the transceiver 12, such as first and second module sides 40, 42. A module connector recess or opening 48 in at least one of the first ring end 52 or second ring end 54 can allow for passage for the optical waveguide(s) such as optical fibers 30 (FIG. 2B) or an optical connector 64, such as a MT ferrule or an electrical cable. Any portion or portions of the ring connector 16 can be made from a metal or polymer.

Each respective row of ring contacts 24 may include a plurality of at least one type of electrical contacts. The electrically insulative ring connector housing 50 can support the rows of ring contacts 24 or the plurality of ring contacts 24. All rows, columns or linear arrays of ring contacts 24 can be held by a single body ring connector housing 50. Alternatively, the ring connector 16 can comprise at least two bodies to support at least two rows ring contacts 24, each body being linked together by at least one ring connector mechanical link member, such as first ring end 52, second ring end 54 or both.

The module connector 14 and the ring connector 16 can each include two, parallel rows of twenty-five module contacts 26 or ring contacts 24, respectively, each. Each row can be designed to support high speed differential signals (GSSGSSG, or GSSGGSSG) as well as one dimensional open pin field contacts. As shown, the transceiver 12, ring connector 16 or both are capable of carrying at least eight differential signal pairs suited for transmitting data between 1 and 112 Gbps or more and, up to twelve low speed signals and power supply voltages. At least twelve, at least sixteen or eight or more differential signal pairs are other options. The length and width of the ring connector 16 can be sized to accommodate a corresponding, mating transceiver 12 or interconnect module 10.

Switching now to FIG. 3, the interconnect module 10-1 may be an electrical transceiver 12, an optical transceiver 12, an optical interconnect module 10-1 or an electrical interconnect module 10-1. The optical transceiver 12 may be comprised of all or any subset of the module connector 14, an optical engine 28 and a module substrate 32. The module connector 14 can include a module connector housing 34 and at least one or at least two rows, columns, or linear arrays of module contacts 26. The module connector 14 may include at least two rows of module contacts 26 located along a first module side 40 and a second module side 42 of the module connector housing 34. The first and second module connector sides 40, 42 can be on opposite sides or neighboring sides of the optical transceiver 12. A third row of electrically module contacts 26 may be located around the second module end 38 of the optical transceiver 12. The optical engine 28 can include a TIA 66, a VCSEL driver 70, photodiodes 68 and VCSELs 72 The optical engine 28 can also include an optical block 78, a ferrule mate 80 or both. An optical block 78 can be positioned on the same surface as the photodiode 68 and VCSEL 72. This arrangement can help make optical alignment easier and more stable. A ferrule mate 80 can be positioned on the module connector housing 34 or interconnect module housing 174 (FIG. 12). The optical connector 64 can releasably or permanently mate with the ferrule mate 80. The optical connector 64 can be a ferrule that carries cables 22, such as optical fibers 30. The optical block 78 and the ferrule mate 80 may couple light between the optical components, such as VCSELs 72 and TIAs 66, and the optical waveguides, such as optical fibers 30 or their respective cores.

The module connector housing 34, (shown as semi-transparent) can perform the following functions: hold the module contacts 26 of each row of the transceiver 12; provide a mechanical link to position and hold each row of module contacts 26 relative to each other; provide an enclosure to protect or to seal the optical engine 28 from the environment; provide mechanical support for the cable 22, detachable cable 22 or optical connector 64; and, provide a pass through for permanently attached optical waveguide(s), such as optical fibers 30.

The module connector 14 may be a low-profile, electrical connector that can mates and un-mate in a direction substantially normal to a major surface M the host substrate 20 that the ring connector 16 (FIGS. 2A and 2B) is soldered to, press-fit into or otherwise attached to. The ring connector housing 50 and the rows of electrically conductive ring contacts 24 of the ring connector 16 can be arranged to fully constrain the transceiver 12 or the interconnect module 10-1 or the module connector 14 along any direction substantially parallel to the major surface M of the host substrate 20 to which the ring connector 16 is mounted. Additionally, the ring connector 16 or the ring connector housing 50 can include a latching system (discussed below) to prevent the transceiver 12 from un-mating when mated to the ring connector 16.

The module connector housing 34 can also provide mechanical support for part of the ferrule mate 80 and/or optical waveguide, such as optical fiber 30. The module connector housing 34 can provide mechanical support to the electrically conductive module contacts 26. Alternatively, the electrically conductive module contacts 26 may be supported in a body separate from the module connector housing 34.

An optical fiber 30 ribbon that can mate to the ferrule mate 80 through a MT ferrule or optical connector 64 is shown. A mechanical apparatus (not shown in FIG. 3) may hold the MT ferrule in place when the optical waveguide is mated to the transceiver 12. The module substrate 32 can be an organic substrate (epoxy glass, polyimide, etc.), a glass substrate, or a ceramic substrate (BeO, AlN, $Al_2O_3$ or LTCC (low temperature co-fire ceramic, etc.)). Each substrate material may be formed with a number of layers bonded together with electrically conductive traces on surfaces of some of the layers. Electrically conductive vias may electrically connect electrical traces on different layers. Each substrate material has pros and cons. Both ceramic and organic substrates can be well suited to route power, low and high-speed signals, and support vias. Surface mount components like electrical connector leads, chip capacitors and resistors, microchip packages (BGA (ball grid array), etc.) and bare die chips can be soldered, flip-chip mounted and/or wire bonded to the module substrate 32 Alternatively, bare die chips can also be epoxied to any substrate material and wire bonded.

Advantages of an organic substrate include low cost and a closer match of the coefficient of thermal expansion to metals and polymers. Metal risers and stiffeners can be soldered to or otherwise attached to the substrate to provide mounting surfaces, spacers or to increase rigidity of the assembly. Organic substrates can have more complex perimeters or outlines than ceramic or glass substrates and allow more easily fabricated through holes. Potential disadvantages of an organic substrate may be difficulties in supporting cavities and pockets, although small components can be embedded in them in certain cases. Organic substrates may also have higher loss for transmitted electrical signals, particularly at high frequencies.

Advantages of a ceramic substrate are generally increased rigidity (higher Young modulus), flatness, and high thermal conductivity. They readily support cavities and pockets and can support wrap around and sidewall metallization. Their coefficient of thermal expansion is a better match to Si and III-V materials, but dimensional tolerances may be hard to control due to batch-to-batch shrinkage variation during the firing process. Glass substrates have desirable dielectric properties allowing transmission of high-speed signals with good signal integrity. In some embodiments, the different layers of the substrate may be formed from different materials.

The optical engine 28 can include at least some of the following selected from the group of, one or more photodetectors or photodiodes 68 and transimpedance amplifiers (TIAs) 66; one or more lasers or VCSELs 72 or one or more laser drivers or VCSEL drivers (DRVs) 70; and an optical coupling system to couple the light to and/or from the optical engine 28 into an optical waveguide, such as an optical fiber 30. The optical coupling system can include a single component, such as a combined or monolithic optical block 78 and ferrule mate 80 or multiple components such as a distinct, separable, or non-monolithic optical block 78 and a distinct, separable, or non-monolithic ferrule mate 80. Stated another way, the optical block 78 and the ferrule mate can be monolithic or can be non-monolithic. In some embodiments the optical engine 28 may include other components, such as an external modulator. The optical engine 28 may have parallel channels that transmit and/or receive high-speed data signals. The optical engine 28 can be positioned substantially between the two rows of module contacts 26 of the transceiver 12. The rows of electrically conductive module contacts 26 can be substantially side by side when seen in a direction parallel to the major surface of the host substrate 20.

The photodetector or photodiodes 68 and TIA 66 and/or the laser/VCSEL 72 and the laser/VCSEL driver 70 can be mounted opposite a thermal interface providing a short path having a large cross-section for conduction of heat generated by the optical engine 28 to travel to a cooling element, such as a heat sink 82, cold plate or heat spreader 172. This arrangement helps to ensure a small temperature differential between the optical engine 28 and the cooling element. The optical block 78 can couple light between the photodiodes 68 and the optical waveguides, such as optical fibers 30, and between laser(s) or VCSELs 72 and the optical waveguides, such as optical fibers 30. The optical block 78 can also perform other functions like redirecting a portion of the light into an optical power measurement system or attenuating light emitted by the laser or VCSEL 72. This embodiment shows a transceiver 12 with a detachable optical cable 22 terminated in an optical connector 64 that can mount to the transceiver 12. In another embodiment the optical waveguide, such as optical fiber 30, may be permanently attached to the transceiver 12.

Thermal vias may be incorporated in any type of host substrate 20 or module substrate 32 to improve thermal conductivity of the host or module substrate 20, 32. The thermal vias may be through holes in the respective host or module substrate 20, 32 filled with a high thermal conductivity material, such as copper.

FIG. 4 shows a cross-sectional, exploded end view of an optical transceiver 12 mated to a ring connector 16. The module connector housing 34 and the module substrate 32 can form a cross-sectional T shape, while the ring connector 16 can form a cross-sectional U shape that can wrap around the vertical portion of the T-shape. When mated in the ring connector 16, the optical engine 28 and module connector housing 34 can be located between the module substrate 32 and the host substrate 20. Since at least a portion of one or more of the module substrate 32, the optical engine 28 and the module connector body 34 can be located in between the rows of electrically conductive ring contacts 26 of the ring connector 16, the total height of the mated transceiver 12 and ring connector 16 above the host substrate 20 can be less than the sum of the total component heights. Similarly, since at least a portion of the module substrate 32 and the module connector housing 34 can be directly above the rows of module contacts 26, a footprint of the ring connector 16 on the host substrate 20 can be as small or even smaller than the largest width of the transceiver 12, as measured from the first module side 40 to the second module side 42.

The module connector housing 34 can be designed to have a portion that is narrower than the module substrate 32. This enables the ring connector 16 that surrounds the module connector housing 34 on two or more sides to be as small as possible (up to not being wider/larger that the module substrate 32). In other words, it allows maximization of the size of the module substrate 32 for a given ring connector 16 footprint. This ensures a maximum width and/or length available for the optical engine 28. Maximizing the available module substrate 32 space helps accommodate larger transimpedance amplifier and laser driver dies, while minimizing the overall footprint on the host substrate 20. The module connector housing 34 can function to protect the optical engine 28 from environmental factors and seal it from the external influences. The seal can be hermetic or not. An interconnect module 10-1 can be inverted and mated to the ring connector 16 via the module connector 14.

The module connector housing 34 can be machined and soldered or welded to the module substrate 32. Alternatively, the module connector housing 34 can be injection molded and epoxied to the module substrate 32. If the module connector housing 34 supports the module contacts 26, it can be reflowed to solder the module contacts 26 to the module substrate 32. Epoxy can then be applied to form a seal between the module connector housing 34 and the module substrate 32. The module connector housing 34 may be made of a single component or a plurality of components. In this embodiment the module connector housing 34 can be thick and have or define a cavity for the optical engine 28 to fit in. This enables the module substrate 32 to be relatively thin, since it does not need a deep cavity in which to situate the optical engine 28.

The module connector housing 34, the module substrate 32, a sealed optical window such as the ferrule mate 80 shown in FIG. 3 and sealing or encapsulant material 130 as shown in FIG. 26) can form a protective enclosure around the optical engine 28. This can increase environmental resilience of the transceiver 12. Separating the optical coupling function and the sealing function allows simplifying the optical block 78 design and provides more design freedom to optimize optical coupling. It can also improve manufacturability.

As shown in FIG. 5A, the ring connector housings 50 can each carry respective ring contacts 24. The second ring end 54 can define a ring housing recess 84 that can coincide with a corresponding raised area (not shown) on the transceiver, such as the transceiver 12 shown in FIG. 6. The ring housing recess 84 and the raised area can act as a polarization feature or key that can be used to prevent mating transceivers 12 to the ring connector 16 that are similar in form factor but different in function. For example, the recess-raised area combination for a ×4 bi-directional transceiver can be different than the recess-raised area combination for a ×12 unidirectional transmitter preventing installing a ×4 transceiver into a ×12 ring connector and vice versa. The ring housing recess 84 can also provide clearance that can allow the passage of the optical or electrical cables 22 or the optical connector 64. As shown, the first ring end 52 and second ring end 54 can be made from metal or an electrically conductive material, can be made from a material that is different from the material used to make the ring connector housing 50, can be devoid of any signal ring contacts 24. An entirety or a portion of the first ring end 52, the second ring end 54 or both can be removed, creating at least one completely open or partially open end.

FIG. 5B shows a perspective view of a transceiver 12 or an interconnect module 10-1 or a module connector 14 inserted in a ring connector 16 mounted to a host substrate 20 to form an interconnect module assembly 18. The transceiver 12 can be installed in the ring connector 16 so that one side of the heat spreader 172 can be exposed and thus can serve as a thermal interface to dissipate waste heat generated during operation to, onto or into a heat dissipative member such a heat sink 82 shown in FIG. 7B. The contact forces between the module contacts 26 of the transceiver 12 and the ring contacts 24 of the ring connector 16 may be substantially normal to the vertical, mating direction between the transceiver 12 and ring connector 16. A first latch 88 can help to secure the transceiver 12 in the ring connector 16. The ring connector 16 can include the first latch 88, such as a first latch 88 that pivots about a boss 90 or can be carried or anchored by the ring connector 16, to help secure the interconnect module 10-1 to the ring connector 16 and a ferrule or optical connector 64 to the transceiver 12 when the interconnect module 10-1 is mated to the ring connector 16, an optical connector 64 that carries optical fiber 30 is attached to the transceiver 12, and the first latch 88 is engaged, closed or activated. Alternatively, the first latch 88 can be configured to only latch the transceiver 12 to the ring connector 16 or ring connector housing 42. A second latch (not shown) can be attached to the ring connector 16, the transceiver 12 or the detachable optical connector 64, and can latch the detachable optical connector 64 to the transceiver 12. Alternatively, the first latch 88 can also latch the detachable optical connector 64 to the transceiver 12 without a second latch. Any latching described herein can be releasably latching.

FIG. 6 is an exploded view of the transceiver 12 with the detachable optical connector 64 and the ring connector 16 of FIG. 5B. The ring connector 16 may comprise, surface mount solder tabs, through hole solder tabs, guide pins, and the first latch 88. The ring connector 16 may be soldered to the host substrate 20. The solder tabs can help to secure the ring connector 16 to the host substrate 20.

Additional solder tabs on the module connector 14 can be designed to secure the module connector 14 to the module substrate 32 shown in FIG. 11. These tabs can be arranged to solder onto the same surface as the contact leads or they can be designed to be soldered into pockets, channels, or recesses in the module substrate 32. This ensures reaction forces in compression, in addition to traction and shear, will resist mechanical forces trying to separate the transceiver 12 from the module substrate 32. The resultant assembly can have increased robustness of the transceiver 12 attachment to the module substrate 32.

The transceiver 12 can mate to the ring connector 16 by inserting the transceiver 12 into the ring connector 16 with the first latch 88 in an open position as shown in FIG. 6. the first latch 88 may be pivot downward to secure the transceiver 12 into the ring connector 16 (see FIGS. 5B, 7C, 7D).

FIGS. 7A-D show various mounting arrangements and transceiver styles. In FIG. 7A the transceiver 12 is secured to the ring connector 16 using fasteners, such as screws. The fasteners may extend through the host substrate 20 or may terminated in the ring connector 20. FIG. 7B shows a cooling element, such as a heat sink 82, attached to the transceiver 12. The heat sink 82 is shown as an arrangement of pin fins, but any type of heat dissipating element may be attached to the transceiver 12 to dissipate waste heat generated by the optical engine 28 shown in FIG. 3 during operation. FIG. 7C shows an electrical transceiver 12 having permanently attached electrical cables 22 mated to a ring connector 16. The first latch 88 is in a closed position securing the transceiver 12 to the ring connector 16. FIG. 7D is similar to FIG. 7C except that the transceiver 12 is an optical transceiver 12 and has a detachable optical cable 22. In this embodiment the first latch 88 can help secure the detachable optical cable 22 or the optical connector 64 to the transceiver 12 as well as the transceiver 12 to the ring connector. Other embodiments will now be discussed. As noted above, some embodiments are generally directed to an interconnect module 10-1, such as a transceiver 12, that is combined with a module connector 14 arranged to mate with a ring connector 16. The transceiver 12 can be a transmitter only, a receiver only, or both a transmitter and a receiver. The module connector 14 may be configured to carry or receive a transceiver 12, transmitter, or receiver that transmits and/or receives signals from an optical or electrical cable 22 and directs the signals from and/or to the host substrate 20. FIG. 8 generally shows a module connector 14 arranged to mate vertically with a corresponding ring connector 16. Electrical connections, such as signal connections, between the module connector 14 and ring connector 16 can be established by mating at least one electrically conductive module contact 26 in the module connector 14 with at least one corresponding electrically conductive ring contact 24 in the ring connector 16.

The module connector 14 can define a module connector housing 34 that can define a general U-shape. A first module end 36 and an opposed second module end 38 can each be devoid of electrically conductive contacts, such as module contacts 26. A first module side 40 can carry a first row, column, or linear array of module contacts 26. A second module side 42 can carry a second row, column, or linear array of module contacts 26. The module connector housing 34 can further define a third module side 44 and an opposed fourth module side 46.

The first and second arrays module contacts 26 can be spaced apart from each other, can be positioned parallel to each other, and can be mirror images of each other. Each module contact 26 can be a stamped, formed and stitched, can be overmolded, can be a blade contact or can be a compliant, receptacle contact. Each module contact 26 can define a respective first contact end 92 and second contact end 94. Each second contact end 94 in the first linear array of module contacts 26 and each respective second contact end 94 in the second linear array of module contacts 26 can extend in directly opposite directions. The module connector housing 34 can be made from an electrically non-conductive material, such as a nylon filled plastic or a glass reinforced or non-reinforced liquid crystal polymer. The fourth module side 46 of the module connector housing 34 can be configured to receive a module substrate 32 shown in FIG. 11 and/or an optical engine 28 shown in FIG. 3 of interconnect module 10. Third module side 44, positioned opposite to the fourth module side 46, can also receive at least a portion of the optical engine 28 shown in FIG. 3 or the module substrate 32 shown in FIG. 11 of the interconnect module 10. The second contact ends 94 of the module contacts 26 can be attached to a module substrate 32. The fourth module side 46 can also be devoid of electrically conductive contacts, such as module contacts 26. The first module end 36 can define a module cable hole that can partially fit around or partially surround a cable such as the cable 22 shown in FIG. 3.

Turning now to the ring connector 16 of FIG. 8, the ring connector 16 can define a ring connector housing 50. A first ring end 52 and an opposed second ring end 54 can each be devoid of electrically conductive contacts, such as second electrically conductive ring contacts 24. A first ring side 56 can carry a third row, column, or linear array of electrically conductive ring contacts 24. A second ring side 58 can carry a fourth row, column, or linear array of electrically conductive ring contacts 24. The third and fourth arrays of second electrically conductive ring contacts 24 can be spaced apart from each other, can be positioned parallel to each other, and can be mirror images of each other. Each ring contact 24 can be a stamped, formed, and stitched, can be overmolded, can be a blade contact or can be a compliant, receptacle contact. Each second electrically conductive ring contact 24 can define a respective first contact end 92A and second contact end 94A. Each respective first contact end 92A can be configured to mate with a corresponding first contact end 92 of a corresponding module contact 26. Each second contact end 94A in the third linear array of ring contacts 24 can extend in a first direction, toward a longitudinal centerline C of the ring connector housing 50. Each ring contact 24 in the fourth linear array of ring contacts 24 can also define a respective second contact end 94A. Each second contact end 94A of the fourth linear array of ring contacts 24 can also extend toward a center of the ring connector housing 50. Stated another way, the second contact ends 94A in the third linear array can be mirror images of the second contact ends 94A in the fourth linear array. The second contact ends 94A can be surface mount, through hole, press-fit, etc. The ring connector housing 50 can be made from an electrically non-conductive material, such as a nylon filled plastic or a glass reinforced or non-reinforced liquid crystal polymer. A third ring side 60 can be configured to receive the module connector 14 and can also be devoid of electrically conductive contacts or electrically conductive signal contacts. A fourth ring side 62 can be positioned opposite to the third ring side 60 that can be configured to face the host substrate 20 shown in FIG. 2B. The first ring end 52 can define a cable hole that can partially fit around or partially surround a cable 22, such as the cable shown in FIG. 3.

FIG. 9A shows a cross-sectional first end view of a interconnect module 10, which can include the module connector 14, mated to a corresponding ring connector 16. An optical connector 64, such as a ferrule or an MT ferrule, can be mated to the interconnect module 10. As noted above, a cross-sectional shape of the interconnect module 10, which can include the module connector 14, can define a general T-shape as the module substrate 32 can have a greater width than the modular connector 14 or the modular connector housing 34.

FIG. 9B is a cross-sectional, end view of a module connector 14 mated with a ring connector 16. More generally, FIG. 9B shows an electrical connector, such as ring connector 16, that can include a housing, such as ring connector housing 50, and at least two linear arrays of electrically conductive contacts, such as third and fourth linear arrays of electrically conductive ring contacts 24. Each of the electrically conductive contacts can have or define a respective first contact end 92A, a respective second contact end 94A, and a respective horizontal section 96. The respective second contact ends 94A in the third linear array of electrically conductive contacts and the respective second contact ends 94A in the fourth linear array of electrically conductive contacts can be mirror images of one another about a common centerline.

Respective horizontal sections 96 of at least three sequential electrical contacts, such as ring contacts 24, can each be retained in an electrically non-conductive material, can each extend toward the common centerline, and can each be positioned orthogonal to the centerline. The respective second contact ends 94A in the third linear array of electrically conductive contacts and the respective second contact ends 94A in the fourth linear array of electrically conductive contacts all extend in a direction toward a common centerline. The housing, such as ring connector housing 50, can be a ring connector housing 50 configured to only make contact with a host substrate 20 at a location substantially opposite respective attachment ends of the respective second contact ends 94A, such as at a protrusion 108 defined by the housing, as shown in FIG. 10.

The second contact ends 94 in the first linear array of module contacts 26 can face in a opposite direction than the second contact ends 94 in the second linear array of module contacts 26 and can be mirror images of one another about centerline C. The second contact ends 94A in the third linear array of ring contacts 24 and the second contact ends 94A in the fourth linear array of ring contacts 24 can face one another and can be mirror images of one another about centerline C. Respective horizontal sections 96 of at least three of the ring contacts 24 can be embedded in plastic, can each extend toward the centerline C, can each be positioned orthogonal to the centerline C, and can each be oriented parallel or substantially parallel to the second contact ends 94 of the modular contacts 26.

The ring connector housing 50 shown in FIG. 9A, or a separate overmold attached to the ring connector housing, can retain, or carry the horizontal section 96 of the ring contact 24. The second contact ends 94A can each extend from the first ring side 56 to the second ring side 58. The second contact ends 94A can each extend from the second ring side 58 to the first ring side 56. This arrangement can shorten the overall height of the ring connector 16, while still retaining normal force and providing enough elastic deflection range of the first contact end 92A on a corresponding first electrically conductive module contact 26.

FIG. 10 shows a method to increase the length and therefore maximum elastic deflection of the first contact ends 92A of the ring contacts 24 while simultaneously minimizing the total height of the ring connector 16. While the first contact ends 92A and the ring contacts 24 are shown with a constant rectangular cross section for clarity and to illustrate the concept, the cross section of a first contact end 92A and/or the ring contacts 24 do not have to be constant or rectangular. The cross section and length of the second electrically conductive ring contact 24 can be optimized to meet deflection, contact force, soldering and signal integrity requirements as needed.

The ring contacts 24 or each ring contact 24 can have a general "L" shape geometry. A horizontal section 96 of a respective ring contact 24 can be mostly encased in the ring connector housing 50 or a separate overmold attached to the ring connector housing. The first contact end 92A and the second contact end 94A can both protrude out of the ring connector housing 50. The first contact end 92A can deflect and the second contact end 94A can be soldered onto the host substrate 20.

The electrically conductive ring contact 24 can be bent upward about ninety degrees to allow mating with a corresponding module contact 26. The ring connector housing 50 can be designed to only make contact with the host substrate 20 at a location substantially opposite the attachment end of the second contact end 94A, such as at a protrusion 108 defined by the ring connector housing 50. A contact force 98 on the contact height 100 above host substrate 20, and a reaction force baseline distance 102 measured between an attachment point of second contact end 94 and a protrusion 108 on the ring connector housing 50, can define a solder joint pull force 104 and a reaction force 106. By modifying the length of the reaction force baseline 102, the solder joint pull force 104 can be adjusted to be within a certain range compatible with the material and processed used to ensure a reliable solder joint while at the same time ensuring a secure holding of the ring contact 24 and meeting a given footprint and height envelope.

The overmolded contact beams, such as ring contacts 24, can be secured into the ring connector housing 50. The ring connector housing 50 can provide multiple functions such as holding multiple rows of ring contacts 24 together, protecting the deflecting first contact ends 92A of the ring contacts 24 against handling damage, guiding the module connector 14 into the ring connector housing 50, interfacing with solder tabs to attach the ring connector 16 to the host substrate 20, provide support for a latching mechanism, such as the first latch 88 shown in FIG. 5A or a third latch 182 shown in FIG. 14, and provide local alignment of the mating ends of the ring contacts 24.

This L-shape or J-shaped beam geometry allows to have a free beam length substantially equal to or longer than the contact height above the PCB 100 distance, while rigidly holding an appropriate length of the ring contacts 24 into the overmolded ring connector housing 50. Advantages include low height of the ring connector 16 and/or the interconnect module assembly 18, sufficient elastic deflection of first contact end 92A, correct contact force of first contact end 92A, low or appropriate solder joint force 104, and good or sufficient mechanical support of ring contact 24.

As shown in FIG. 11, an interconnect module 10 can include an optical connector receptacle or a ferrule mate 80. The ferrule mate 80 can be made from an optically transparent material. The ferrule mate 80 can define a first side 110, a second side 112, a third side 114, a fourth side 116, a first end 118, and a second end 120. The first side 110 can include at least one first recess 122. The third side 114 can be a recess or slanted surface defined by or defined in the fourth side 116. The first side 110 can further define or include at least one first focusing or collimating lens 124 and/or at least one second focusing or collimating lens 126 positioned in the at least one first recess 122. The at least one first focusing or collimating lens 124 can include an array or arrays of first lenses. The at least one second focusing or collimating lens 126 can include an array or arrays of second lenses. Each first and/or second lens 124, 126 can be a collimating lens and/or a focusing lens, depending on the direction of the light passing through each respective first or second focusing/collimating lens 124, 126.

The first side 110 can define at least one second recess 132 positioned adjacent to the at least one first recess 122. At least one spacing reference 134 can be positioned adjacent to at least one first recess 122. The at least one spacing reference 134 can be continuous around the at least one first recess 122. The at least one spacing reference 134 can fully or partially circumscribe the at least one first recess 122.

An optically transparent plate 136 can be positioned adjacent to the first side 110. The optically transparent plate 136 can be a glass plate. The optically transparent plate 136 can be positioned adjacent to the first side 110 and define a first gap 138. The first gap 138 can be filled with or include air, N2, vacuum, etc. between the optically transparent plate 136 and the first focusing lens or the first collimating lens 124.

A first seal 140 can be positioned in the second recess 132 between the optically transparent plate 136 and the first side 110. The first seal 140 can surround, bound, or circumscribe the first recess 122.

The second side 112 of the optical connector receptacle or ferrule mate 80 can define at least one third recess 142. A bottom 144 of the third recess 142 can be an optical surface, and the optical surface can be planar.

The third side 114 can define at least one reflection surface 146. A reflection surface cover plate 148 can be positioned over the at least one reflection surface 146. A second gap 150, which can be a fluidly sealed gap, can be defined between the reflection surface 146 and the reflection surface cover plate 148. The second gap 150 can be filled with or include air, N2, vacuum, etc.

The reflection surface 146 can reflect light through total internal reflection or through a reflective coating, such as a metallized coating. The reflection surface 146 can be intentionally degraded by laser ablation. The reflection surface 146 can be intentionally degraded by laser ablation after the reflection surface cover plate 148 is positioned adjacent to the third side 114 of the ferrule mate 80. The reflection surface cover plate 148 can be transparent to light. Alternatively, the reflection surface cover plate 148 can be omitted. The interconnect module 10 can include a lid 152. The lid 152 can be a metal plate with a hole or through hole that allows light to pass through the lid, glass with no hole, an optically transparent substrate with a flip-chip optical engine, etc. The lid 152 can be positioned adjacent to the second side 112 of the ferrule mate 80. The lid 152 can define a lid cavity 154 or through hole. The lid cavity 154 or through hole can be in optical communication with the third recess 142. The optical connector receptacle or ferrule mate 80 can be carried by the lid 152. The ferrule mate 80 can be sealed to the lid 152 by a lid seal 156. The lid cavity 154 can be designed to be large enough to allow alignment of the optical components with the optical beams defined by the laser and photodiodes without interference. Stated another way, the area of the lid cavity 154 can be larger than the area of the optical block 78, so that the optical block 78 is not physically disturbed when the lid 152 is positioned on or attached to the module substrate 32 or the module connector 14 shown in FIG. 9A. Similarly, the interface between the lid 152 and the ferrule mate 80 can be designed to allow the ferrule mate 80 to be optically aligned with the optical block 78.

The interconnect module 10 can further include an optical block 78, such as a vertical, right angle, or coplanar optical block 78. The optical block 78 can be positioned in the lid cavity 154. A portion of the optical block can at least partially overlap or overhang a boundary of the lid cavity 154. The optical block 78 can be positioned, partially or completely, in the at least one third recess 142. The optical block 78 can be made from an optically transparent material. The optical block 78 can include at least one third lens 158 or an array or arrays of third lenses. Each third lens 158 can be a collimating lens and/or a focusing lens, depending on the direction of light passing through each respective third lens. The optical block 78 can include at least one fourth lens 160 or an array or arrays of fourth lenses. Each fourth lens 160 can be a collimating lens or a focusing lens, depending on the direction of light passing through each respective fourth lens. The optical block 78 can include a first surface 162 and a second surface 164. The first surface 162 can face the third recess 142 in the optical block 78. The third and fourth collimating and/or focusing lenses 158, 160 can be located on or adjacent to the second surface 164.

The interconnect module 10 can include at least one vertical cavity surface emitting laser (VCSEL) 72. A VCSEL driver 70 can be wire bonded or otherwise electrically connected to the VCSEL 72. The interconnect module 10 can include at least one photodiode 68. A transimpedance amplifier (TIA) 66 can be wire bonded or otherwise connected to the photodiode 68. Positions of the VCSEL driver 70 and the TIA 66 on the module substrate 32 can reversed from the respective positions shown in FIG. 11. The VCSEL 72 can be positioned adjacent to a second surface 164 of the optical block 78. A third gap 166 can be defined between the first surface 162 of the optical block 78 and the second side 112 of the ferrule mate 80. A sealed lid space 232, as shown in FIG. 16, and third gap 166 can be sealed around the lid cavity 154 by the ferrule 18 and the lid seal 156.

The interconnect module 10 can include a module substrate 32, such as a PCB, ceramic, glass, metal, or other substrate material. The VCSEL driver 70 can be carried by the module substrate 32, such as the first module substrate side 74 of the module substrate 32. The TIA 66 can be carried by the module substrate 32, such as a first module substrate side 74 of the module substrate 32. A heat spreader 172 can include a riser 168. The riser 168 can extend into a riser cavity 170 that can be defined by the module substrate 32. The VCSEL 72 can be carried by the riser 168. The riser 168 can dissipate, conduct, transfer, or transport unwanted heat from the VCSEL 72 to the heat spreader 172. The photodiode 68 can be carried by the riser 168. The optical block 78 can also be carried by the riser 168. The optical block 78 can span over or form a bridge above the VCSEL 72 and photodiode array or arrays 68, allowing the optical block 78, VCSELs 72 and photodiodes 68 to be attached to the same reference surface. The interconnect module 10 can be configured to mate with an optical connector 64, such as a ferrule or a MT ferrule. The optical connector 64 can include at least one optical fiber 30. A core of the at least one optical fiber 30 can be in physical contact with the optically transparent plate 136 when the optical connector 64 is mated with the interconnect module 10 or the ferrule mate 80.

The heat spreader 172 can be positioned on a second module substrate side 76 of the module substrate 32, opposite to the first module substrate side 74. The heat spreader 172 can transfer heat from the optical engine, which can include the TIA 66, the photodiode 68, the VCSEL driver 70, the VCSEL 72 and the optical block 78, to an external cooling member, such as a heat sink 82 shown in FIG. 7B. The heat spreader 172 can also act as a mechanically rigid platform to interface with the external heat sink 82. The heat sink 82 can be a cold plate, can be a liquid-cooled cold plate, can be an air-cooled heat exchanger (FIG. 7B), or can be a thermally conductive material submerged into a cooling fluid other than air. A thermally conductive interface material can be positioned between the heat spreader 172 and the heat sink 82 to increase heat transfer between the heat spreader 172 and the heat sink. Alternatively, the heat sink 82 can be directly attached on the second module substrate side 76 of the module substrate 32. The heat sink 82 can be formed integrally with, unitarily with or non-separately from any one of the interconnect module 10 or the heat spreader 172. As another alternative, the heat sink 82 can mechanically attach to the heat spreader 172 or another component of the interconnection module 10 and/or thermally contact the heat spreader 172, either directly, indirectly through a thermally conductive, compliant interface material, or both. The heat spreader 172 or heat sink 82 can define a riser 168 onto which the VCSEL 72 and photodiode 68 can be mounted. The TIA 66 and the VCSEL driver 70 can be mounted on the riser 168. These configurations, alone or in combination, minimize the thermal impedance and/or temperature rise between the optical engine (TIA/photodiodes/VCSEL driver/VCSEL) 66, 68, 70, 72 and the heat spreader 172 or heat sink 82.

Moving along to FIG. 12, the interconnect module 10 can include a interconnect module housing 174. The interconnect module housing 174 can be a single component or an assembly of a plurality of components, such as side wall and a lid 152. The interconnect module housing 174 can sit on or be carried by a first module substrate side 74 of the module substrate 32. The interconnect module housing 174 can be configured to internally receive an optical connector 64, such as a MT ferrule that has a MT ferrule housing 178. The MT ferrule housing 178 can define a longitudinal length 180, and at least sixty to one hundred percent of the longitudinal length 180 of a MT ferrule housing 178 can extend into or be bounded within a footprint area defined by at least two perpendicular sidewalls of the interconnect module housing 174 that can both extend perpendicularly with respect to a major plane of the first module substrate side 74 of the module substrate 32. The interconnect module 10 can include a module connector housing 34 shown in FIG. 9A that circumscribes one or more of a module substrate 32, a lid 152, a ferrule mate 80, an optical block 78 shown in FIG. 11, a heat spreader 172 shown in FIG. 11, heat sink 82 shown in FIG. 7B, electrical components (not shown), or optical components (not shown). The module connector 14 can further circumscribe the optical connector 64 or ferrule.

The interconnect module 10 can include a third latch 182 that functions similarly to the first latch 88 of FIG. 6. The third latch 182 can define two opposed latch ends, such as first latch end 184 and a second latch end 186. The two opposed first and second latch ends 184, 186 can both be visually different or structurally different from one another. One of the two opposed first and second latch ends 184, 186 of the third latch 182, such as the first latch end 184, can always be attached to the interconnect module 10 or interconnect module housing 174, even when the third latch 182 is disengaged from the optical connector 64. In a mated or closed position, the third latch 182 can retain the MT ferrule housing 178 or the optical connector 64, against the first side 110 of the ferrule mate 80 or the plate 136. The third latch 182, shown in an unmated or open position in FIG. 12, can be a rotatable third latch 182 that is configured to compress the MT ferrule housing 178 and the ferrule mate 80 together through opposed forces applied to a back side 188 of the MT ferrule housing 178 or other connector and directly or indirectly to the fourth side 116 of the ferrule mate 80 when the MT ferrule housing 178 is mated to the interconnect module 10 and the third latch 182 is in the engaged or closed position. The third latch 182 does not create any mechanical stress at an interface between the second side 112 of the ferrule mate 80 and the lid 152 when the ferrule or connector or MT ferrule housing 178 or optical connector 64 is attached to the ferrule mate 80 and the third latch 182 is in the engaged or closed position. There is also no mechanical stress present on the interface when the third latch 182 is disengaged. The elimination of mechanical stress at the interface between the ferrule mate 80 and the lid 152 helps to preserve alignment of the ferrule mate 80 with the third and fourth lens 158, 160 lens of the optical block 78 shown in FIG. 11, the VCSELs 72 shown in FIG. 11 and the photodiodes 68 shown in FIG. 11 and can help to maintain an integrity of the lie seal 156. The third latch 182 can be floating, yet captive, within the interconnect module 10 or the interconnect module housing 174. A mechanical block or intermediate spacer or absorber block or force application member, all generally referred to as a bushing 190 can be inserted between the first latch end 184 of the third latch 182 and the fourth side 116 of the ferrule mate 80. Bushing 190 can directly engage the fourth side 116 of the ferrule mate 80, or indirectly through a spacer or other material positioned between the fourth side 116 of the ferrule mate 80 and the bushing 190. Therefore, the bushing 190 can be configured to physically contact the fourth side 116 of the ferrule mate 80 or not physically contact the fourth side 116 of the ferrule mate 80.

The third latch 182 can be physically attached to the interconnect module housing 174 and be either non-removable or selectively removable from the interconnect module housing 174. The third latch 182 can be attached to the interconnect module housing 174 or the bushing 190 by any suitable method that permits the third latch 182 to rotate and/or translate with respect to the interconnect module housing 174, the bushing 190, or both. In one possible embodiment, the third latch can include an axle 192, such as an axle 192 that is unitarily formed or integrally formed or removably formed with the third latch 182. The third latch 182 can have no axle, but still be pivotally or rotationally retained by the interconnect module housing 174 by one or more third latch protrusions 194 that can each be configured to be received in a corresponding guide hole 196 defined by the interconnect module housing 174. In this instance, the third latch 182 itself or an intermediate member moved by the third latch 182 can move the bushing 190 toward the fourth side 116 of the ferrule mate 80. Alternatively, the third latch 182 can define an orifice or opening (not shown) that is configured to receive a post or protrusion (not shown) formed by either the interconnect module housing 174, or the bushing 190, or both. In general, if a bushing 190 is used, the third latch 182, the axle 192, or an intermediate member positioned adjacent to the bushing 190 can move the bushing 190 toward the fourth side 116 of the ferrule mate 80. The third latch 182, the axle 192 or the intermediate member can respectively define at least one protuberance, boss, cam, or spring 202 that can force the bushing 190 against the fourth side 116 of the ferrule mate 80 when the third latch 182 is in a closed or engaged position.

In conjunction with a closing, engaging, or locking motion of the third latch 182, the movable or floating bushing 190 can exert a force against the fourth side 116 of the ferrule mate 80. The third latch 182 can exert an opposite force against the MT ferrule housing 178 or optical connector 64, such as against the back side 188 of the MT ferrule housing 178 or optical connector 64, which in turn can force the core of an optical fiber 30 (FIG. 11) into physical contact against the optically transparent plate 136 (FIG. 11) or the first side 110 of the ferrule mate 80 when the third latch 182 is in a closed, engaged, or locked position. The third latch 182 can be configured not to exert an opposite force against the ferrule or optical connector 64 or the back side 188 of the ferrule or MT ferrule housing 178 or optical connector 64 when the third latch 182 is in an open position, unlocked or unengaged position.

FIG. 13 shows that the bushing 190 can define a bushing recess 204 that can be configured to receive, permanently or repeatedly removably, the axle 192 of the third latch 182. The guide hole 196 can also be oversized, or have an inner diameter than is greater than an outer diameter of the axle 192. The guide hole 196 can be oblong and allow the axle 192 to move towards and away from the fourth side 116 of the ferrule mate 80 and allow the axle 192 to, directly or indirectly through bushing 190, either contact and apply a force onto the ferrule mate 80 or not contact and not apply a force onto the ferrule mate 80. The axle 192 or the third latch 182 can move laterally within the confines of the guide hole or holes 196. As discussed earlier, when the third latch 182 is rotated to a closed, engaged, or latched position, a latch retention surface 206 of the third latch 182 can physically contact the back side 188 of the MT ferrule housing 178 or optical connector 64, or directly or indirectly exert a force against the back side 188 of the MT ferrule housing 178 or optical connector 64. The ferrule mate 80 can be sandwiched between the MT ferrule housing 178 or optical connector 64 and the bushing 190, with the fourth side 116 of the ferrule mate 80 configured to receive a portion of the bushing 190.

FIG. 14 shows the interconnect module 10 of FIGS. 12 and 13 with a module connector 14 attached to the interconnect module 10 and mated to ring connector 16. An optional cover plate 148, not shown, can be positioned on the fourth side 116 of the ferrule mate 80. The lid 152 can be unitary with the interconnect module housing 174 and the interconnect module housing 174 can define a continuous or segmented rib or standoff 208 to provide a lid space above first module substrate side 74 for an optical engine 28 and other optional components. The microcontroller 210 may be positioned on a second module substrate side 76 of the module substrate 32 opposite to the VCSEL 72 or photodiode 68. The heat spreader 172 can define at least one heat spreader cavity or through hole 198 that can be configured to receive an electrical component, such as microcontroller 210. The interconnect module 10 may use different types of microcontrollers 210 having different capabilities. The microcontroller 210 can have differing heights, which in turn increase or decrease the overall height of the interconnect module 10. Generally, microcontroller that provide secure firmware and/or cryptographic capabilities, referred thereafter as secure firmware chips, are taller or larger in height than non-secure firmware chips that do not offer these capabilities. For example, a mated stack height of a respective interconnect module assembly 18, including both the module connector 14 and the ring connector 16, can be between approximately 3.6 mm to 6.6 mm with secure firmware chips and approximately 3.2 mm to 6.2 mm with non-secure firmware chips. In general, the interconnect module assemblies 18 described herein can each have an overall stack height in the range or approximately 3 mm to 7 mm, less than approximately 7.2 mm and greater than approximately 2.8 mm, including 7.2 mm and 2.8 mm. Nothing herein prevents an interconnect module assembly 18 from having an overall stack height greater than approximately 7.2 mm or less than approximately 2.8 mm. The third latch 182 can have a latch surface that covers a majority of the ferrule or the MT ferrule housing 178.

A second interconnect module 10A is shown in FIG. 15. One difference between interconnect module 10 in FIG. 14 and interconnect module 10A is that the interconnect module 10A can include a static latch frame 214 that can be defined by or be part of the interconnect module housing 174. A bridge 216 part of the static latch frame 214 can limit the ferrule or optical connector 64 from rotating when the cables 22 are yanked in opposed up and down third and fourth directions D3, D4. A first opposed latch frame sidewall and a second opposed latch frame sidewall (not shown in the cross-section) can limit the ferrule or optical connector 64 from rotating in fifth and sixth directions when the cables 22 are yanked side-to-side in directions orthogonal to the third and fourth directions.

The static latch frame 214 can be attached to the lid 152 and abut against the fourth side 116 of the ferrule mate 80, effectively providing a reaction surface to absorb a compression force created by the third latch 182 and the ferrule or optical connector 64 onto the ferrule mate 80 when the third latch 182 is engaged or closed so as to not transmit compression force to the lid 152.

At least one or at least two latch extensions 228 can be long enough to protrude past the first module end 36 of the module connector 14 or module connector housing 34. After the interconnect module 10A is removed from the ring connector 16 shown in FIG. 9A, the third latch 182 can be opened and closed. The at least one or the at least two latch extensions 228 can provide a surface or surfaces to press on, pull on, to move or rotate or translate and latch or unlatch, the third latch 182 and attach or remove the ferrule or the optical connector 64 from interconnect module 10A by a user without any tools. Stated another way, at least one latch extension 228 can allow for easy latching or unlatching of the third latch 182.

The third latch 182 can include at least one movable latch arm or at least two spaced apart, parallel latch arms 224. The third latch 182 can define at least three sides. At least one movable latch arm, or both movable latch arms 224 can be positioned beside the static latch frame 214, and can rotate about a pivot point 226, such as a pivot point 226 defined between an axle 192 of the third latch 182 and a corresponding guide hole 196 (FIG. 12) in the static latch frame 214.

The lid 152 can be supported by one or more supports 230 positioned on the first module substrate side 74 of the module substrate 32. The support 230 can be a continuous ring that can allow for easy sealing of the lid 152 to the support 230. The lid 152, the support 230, and the first module substrate side 74 can cooperatively define a lid space 232. The lid space 232 can accommodate electrical or optical components and can be sealed from the environment. The support 230 can be made from a polymer or metal, and the lid 152 can be attached to the support or supports 230 by epoxy, adhesive, soldering, laser welding, fasteners, etc.

Certain applications might require the interconnect module 10A to operate in a contaminated environment, and it can therefore be beneficial to seal the optical engine and the optical path from the environment. The interconnect module 10A of FIG. 15 can create a sealed enclosure around the optical engine that can be composed by the module substrate 32, the support 230, the lid 152 and the ferrule mate 80. The support 230 in the interconnect module 10A of FIG. 15 favors maximizing substrate real estate within the sealed cavity. This configuration allows sensitive components to be located in the sealed cavity and provides more room or usable surface area within the sealed cavity for components or sensitive components.

The optical block 78 in the interconnect module 10A of FIG. 15 can be attached to the same structure, such as a riser 168 (FIG. 18) or the module substrate 32, as the respective VCSEL 72 and the photodiode arrays 68. Common attachment to the same structure helps to provide mechanical and thermal alignment stability of the VCSEL 72 and the photodiode arrays 68 with respect to the optical block 78. Similarly, the ferrule mate 80 can directly mate with the optical connector 64, such as the ferrule with cables 22. This can help maintain optical alignment by minimizing mechanical translations due to mechanical or thermal stresses between the ferrule mate 80 and the ferrule or optical connector 64.

At least one optical beam or two or more optical beams traveling between the optical block 78 and the ferrule mate 80 or travelling between the ferrule mate 80 and the optical block 78 can be at least one collimated optical beam or separate, respective collimated optical beams.

By using a collimated beam or beams, coupling efficiency remains acceptable over a larger range of mechanical translations between the optical block 78 and the ferrule mate 80 due to unwanted mechanical or thermally induced stresses.

The ferrule mate 80 can be mechanically attached to the lid 152. Alignment stability between the module substrate 32 and the lid 152 or the ferrule mate 80 is therefore less critical for coupling efficiency than alignment between the photodiodes 68, VCSEL 72 and the optical block 78 or alignment between the ferrule or optical connector 64 and the ferrule mate 80.

A third interconnect module 10B of FIG. 16 can be similar to FIG. 15. At least one difference can be that the lid 152 of the interconnect module 10B can be shorter in overall length. A shorter lid 152 can provide more stability than a longer lid 152 which is more susceptible to bowing. The increased stability of the lid 152 can allow an optical block, such as an optical block plate 234 shown in FIG. 16, to be attached to or carried by the lid 152. The flat, optical block plate 234 might be sealed to the lid 152 more easily than the optical blocks described above. Moreover, the optical block plate 234 and the ferrule mate 80 can be connected together without an air gap therebetween and with an index matching material, such as an adhesive. This can eliminate at least two Fresnel reflections and increase the amount of transmitted light. For example, the FIG. 16 interconnect module 10B can improve the amount of transmitted light through the optical components by up to about ten percent as compared to the interconnect module 10A design shown in FIG. 15.

Generally, Fresnel reflections occur at an interface between an optical component, such as the optical block 78, the ferrule or optical connector 64 or the ferrule mate 80, and the air or other transmission medium. Stated another way, Fresnel reflections can occur at an interface between two mediums that each have different indexes of refraction. Fresnel reflections can be reduced by the use of an anti-reflection coating on non-air surfaces along the optical or light path. Anti-reflection coating can be undesirable due to cost or reliability reasons. It is therefore desirable to minimize the number of Fresnel reflections in the optical or light path.

The shorter lid 152 also creates a smaller sealed lid space 232 for electrical components, but provides more module substrate 32 real estate outside of the sealed lid space 232, such as compartment 200.

Both designs of FIGS. 15 and 16 can feature a riser 168 that is separate from the heat spreader 172 located on the second module substrate side of the module substrate 32. The module substrate 32 can be an organic substrate or a PCB, on which the riser 168 is attached on one side, such as the first module substrate side 74, to support the VCSEL 72 and photodiode arrays 68. The riser 168 can be positioned on one side of the module substrate 32, such as on the first module substrate side 74, separate from the heat spreader 172, and the heat spreader 172 can be mounted on the opposite side of the module substrate 32. The absence of a hole through the module substrate 32 to receive the riser 168 can prevent any leaks at an interface between the module substrate 32 and the riser 168.

FIG. 17 shows a fourth interconnect module 10C. Compared to the third interconnect module 10B, the interconnect module 10C can include a ceramic module substrate 32, a ceramic lid 152, or both. The ceramic module substrate 32 can be a multilayer ceramic substrate, a low temperature co-fired ceramic (LTCC) substrate, a high temperature co-fired ceramic (HTCC) substrate or other suitable substrate. Heat spreader cavity 198 and the lid space 232 can be created during the layering process of the ceramic module substrate 32. The heat spreader cavity 198 can be configured to accept or accommodate components, such as microcontrollers 210, while simultaneously minimizing the height of the interconnect module 10 or the interconnect module assembly 18, as measured orthogonal to the major plane of the host substrate 20 (FIG. 6). Similarly, the lid space 232 can be configured to accommodate or receive electrical or optical components such as a TIA, a photodiode array, a VCSEL driver, a VCSEL, and/or an optical block while simultaneously minimizing the height of the interconnect module 10 or the interconnect module assembly 18, as measured orthogonal to the major plane of the host substrate 20 (FIG. 6). Ceramics can offer improved thermal and mechanical properties and lower height compared to organic material. One or more latch extensions 228 can be completely bounded by or stay within an outer perimeter of the module connector 14. The third latch 182 and the bushing 190 can be moved farther from the first module end 36 of the module connector 14. A separate heat spreader 172 (FIG. 14) may not be needed, because the ceramic module substrate 32 can have an intrinsically high Young's modulus and thermal conductivity, the ceramic heat spreader can also function as a heat spreader 172.

Now for something a bit different, FIG. 18 shows a fifth interconnect module 10D. Optionally, the module substrate 32 can be a ceramic based substrate that can define a riser 168 and photodiodes 68 and VCSELs 72 can mounted directly to the riser 168. The TIA 66, photodiodes 68, VCSEL driver 70 and VCSELs 72 can be mounted directly on the ceramic based module substrate 32. Unlike the earlier embodiments, a interconnect module 10D can include a custom ferrule 236, such as a non-MT ferrule, optimized for size and/or sealing ability or other properties.

For example, a custom interconnect module 10D can include a custom ferrule 236. The custom ferrule 236 can include at least one, at least two or at least three or more of any one of the following structures, attributes or properties: a smaller custom ferrule 236 or optical connector housing height; a smaller custom ferrule 236 or optical connector housing width; a smaller custom ferrule 236 or optical connector housing length; first and second lenses 124, 126 located on the custom ferrule 236 instead of the ferrule mate 80, wherein each of the first lenses 124 and second lenses 126 are fixed with respect to their respective optical waveguide or optical fiber 30; an interface between the custom ferrule 236 and the ferrule mate 80 can be designed to be easily sealed; the custom ferrule 236 can be permanently attached to the ferrule mate 80; the custom ferrule 236 can be repeatably separable from the ferrule mate 80; a distance between adjacent, parallel centerlines of rows or linear arrays of optical waveguides or optical fibers 30 can be reduced in distance.

Custom ferrules 236 and ferrule mates 80 that are smaller than MT ferrules can provide size and stack height reductions of the interconnect module 10 and the corresponding interconnect module assembly.

Locating first and second lenses 124, 126 on the ferrule or custom ferrule 236 instead of the ferrule mate 80 can decouple the alignment between the first and second lenses 124, 126 and their corresponding waveguides or optical fibers 30 from the mating of the ferrule or custom ferrule 236 to the ferrule mate 80. Similar to having a collimated beam between the optical block 78 and the ferrule mate 80, having a collimated beam between the custom ferrule 236 and the ferrule mate 80 reduces alignment and stability requirements to maintain a high optical coupling efficiency.

The custom ferrule 236 can be permanently attached to the ferrule mate 80 using adhesive, epoxy, sonic welding, or other joining methods to create a sealed cavity 238 between the custom ferrule 236 and the ferrule mate 80. All the optical paths go through this sealed cavity 238, which can be filled with air or other gas. Permanently attached can mean that the custom ferrule 236 is not designed to be removed from the ferrule mate 80 once the custom ferrule 236 is attached to the ferrule mate 80. The custom ferrule 236 can be included in or permanently attached to the interconnect module 10D, and one or more of the ferrule mate 80, The bushing 190 and the third latch 182 of FIG. 17 can be excluded from the interconnect module 10D. The custom ferrule 236 can be directly mounted onto the lid 152.

The custom ferrule 236 can be repeatably attached or repeatedly separated from the ferrule mate 80. Repeatedly attached/repeatably separable can mean that the custom ferrule 236 is configured to be attached to or removed from the ferrule mate 80 once the custom ferrule 236 is attached to the ferrule mate 80.

In the case of a separable custom ferrule 236, the sealing of the sealed cavity 238 between the custom ferrule 236 and the ferrule mate 80 can be achieved by the use of a compressible or elastomeric member, such as a sealing gasket. The elastic or compressible member can be compressed by the actuation of a third latch 182 (not shown in FIG. 18) when the third latch 182 is engaged or latched, effectively creating a seal between the custom ferrule 236 and the ferrule mate 80. The final resting position of the custom ferrule 236 relative to the ferrule mate 80 can be guaranteed by respective standoff or limit features on the custom ferrule 236, on the ferrule mate 80, or both, independent of the compressible member.

Finally, the module connector 14 shown in FIG. 18 has not been optimized in height to take advantage of the lower height of the optical train assembly. A lower profile module connector 14 or ring connector 16 (FIG. 8) or optional third latch 182 (FIG. 17) can be designed to achieve a lower profile interconnect module 10D.

FIG. 19, which shows a sixth embodiment interconnect module 10E, can be similar to the fifth embodiment interconnect module 10D of FIG. 18. The interconnect module 10E of FIG. 19 can feature a custom ferrule 236A that is different than the custom ferrule 236 of FIG. 18. One difference between the FIG. 18 interconnect module 10D embodiment and the FIG. 19 interconnect module 10E embodiment is that the waveguide array, which can be optical fibers 30, the third set of lenses 158, the active areas of the photodiode 68 and VCSEL 72 arrays or, alternatively, centers of the photodiode 68 and VCSEL 72 arrays, and the optical beams can be aligned in a single row, along a common straight line or parallel to a common straight line. For example, eight channels can be carried by a 1×8 array of optical fibers 30 or can be carried by a standard 1×12 array of optical fibers 30 with four unused or dark optical fibers 30. Similarly, sixteen channels can be carried by a 2×12 array of optical fibers 30 with eight unused or dark optical fibers 30, alternatively, as shown in FIG. 19, the sixteen channels can be carried by a 1×16 array of optical fibers 30 with no unused or dark optical fibers 30.

The ferrule mate 80 of FIG. 18 can be omitted. Having all of the optical beams positioned along a single row or a single linear array, versus two rows or two parallel linear arrays, allows the reflection surface to be moved from the ferrule mate 80 to the custom ferrule 236A and the first lens 124 to be moved from the ferrule mate 80 to the bottom side of the custom ferrule 236A. The custom ferrule 236A can be aligned and attached directly to the interconnect module 10E and optically interface with the optical block plate 234. The alignment and attachment of the custom ferrule 236A can be performed during manufacturing of the interconnect module 10E and the custom ferrule 236A can be permanently attached using any appropriate attachment methods such as adhesive, epoxy or crimping. Alternatively, a receptacle (not shown) can be added to the interconnect module 10E to receive, align, and retain the custom ferrule 236A with the interconnect module 10E. A selectively movable latch, such as first, second or third latches 88, 182 can secure the custom ferrule 236A in the interconnect module 10E.

The use of an index matching material between the optical block plate 234 and the custom ferrule 236A can yield a single Fresnel reflection surface in the optical path.

The overall height of any one or more of the interconnect module 10E, the interconnect module assembly, and the module connector 14 and ring connectors can be reduced compared to an interconnect module 10D with two rows of optical fibers 30. Respective heights of the ring and module connectors have not been optimally minimized in the FIG. 19 embodiments but can further be reduced in height.

The module substrate 32 can be made from PCB material, and the lid 152 can sit on, and can be sealed to, a support or supports 230 carried by the first module substrate side 74 of the module substrate 32. The support 230 can define a continuous ring, oval, ellipse, trapezoid, etc.

FIG. 20 shows a seventh interconnect module 10F that can be similar to the first interconnect module 10 of FIG. 14. One difference is the heat spreader 172 can define a riser 168 that can extend through a hole in the module substrate 32 and can carry one or more arrays of photodiodes 68, TIAs 66, VCSELs 72, VCSEL drivers 70 and the optical block 78. This physical arrangement on the riser 168 can provide a direct thermal path, without interfaces, from the optical engine components to a back heat spreader side 128 of the heat spreader 172 to a heat sink or cold plate. The heat spreader 172 can extend beneath a mated ferrule, ferrule housing, or optical connector 64, the latch frame 214 or both.

FIG. 21 is an eighth interconnect module 10G that can be similar to the seventh interconnect module 10F shown in FIG. 20. One difference is that the support 230 (FIG. 19) for the lid 152 can be replaced by a ledge 240 or other feature directly formed by the module connector 14. The lid 152 can be supported, sealed to, or attached to the module connector ledge 240 or other feature. The interconnect module, the module connector 14 and the ring connector 16 (FIG. 8) can be narrower in width than embodiments described above because the ledge 240, rather than being a separate member on the module substrate 32, can be incorporated, or formed directly by, the module connector 14.

The ledge 240 or other feature formed in the module connector 10G can be narrower than a separate support and the required mechanical tolerance around the support 230 (FIG. 8) can be reduced. This results in an interconnect module 10G that can have a narrower overall width, shorter overall length and/or provide more surface area or available on the module substrate 32 for electrical routing and components.

The ninth interconnect module 10H of FIG. 22 can be similar to the eighth interconnect module 10G of FIG. 21 and can further combine the shorter lid 152 shown in FIG. 16. At least one ledge 240 can be defined by or formed by the module connector housing 34 and can be moved closer to the ferrule mate 80 to support the shorter lid 152.

As shown in FIG. 23, the tenth interconnect module 10I can be similar to the ninth interconnect module 10I of FIG. 22. At least one difference is that the reflection surface 146 of the ferrule mate 80 can be selectively ablated or selectively defeated by a focused laser beam or some other method after the interconnect module 10I has been assembled. For example, the static latch frame 214 can define an angled or sloped latch frame surface 242 to prevent clipping of the laser beam used to intentionally, selectively and partially defeat the reflection surface. The sloped latch frame surface 242 of the static latch frame 214 and the angled reflection surface 146 or angled reflection surface cover plate 148 can each lie in a corresponding one of two converging and intersecting planes, such that the sloped latch frame surface 242 converges toward the reflection surface cover plate 148 at one end of the sloped surface and diverges from the reflection surface cover plate 148 at an opposed end of the sloped latch frame surface 242. Stated another way, the reflection surface 146 and/or the reflection surface cover plate 148 can be angled on the ferrule mate 80, such as at a 45 degrees angle with respect to the lid 152. The sloped latch frame surface 242 of the static latch frame 214 can also be angled with respect to the lid 152.

A method can include steps of, in order, providing a reflection surface 146, positioning a reflection position cover plate 148 over the reflection surface 146 and intentionally defeating the reflection surface 146 with an ablator, such as a laser. The reflection surface 146 can be only partially defeated by ablation or other suitable method after the reflection position cover plate 148 is attached to the ferrule mate with optically transparent glue, adhesive, or epoxy or sonic welding.

Another interconnect module 10J is shown at FIG. 24. Compared to the interconnect module 10I of FIG. 23, the interconnect module 10J can include a heat spreader 172 with a riser 168 that only carries the VCSEL arrays 72, the photodiode arrays 68 and the optical block 78.

An interconnect module 10K is shown in FIG. 25. The ferrule mate 80 of FIG. 25 can be replaced with a ferrule mate assembly, that can include a ferrule mate 80 and a glass plate 136, as discussed with respect to FIG. 10. The interconnect module 10K shown in FIG. 25 does not have any portions of the optical beams or optical interfaces exposed to the external environment. Therefore, the interconnect module 10K shown in FIG. 25 can be used in contaminated environments or submerged in a cooling liquid without degrading the optical coupling performance within the interconnect module 10K.

FIG. 26 shows another interconnect module 10L. Compared to FIG. 25, one difference is that the optical engine 28 can be sealed by potting the optical engine components with an encapsulant 130 that is transparent to light. For example, light transparent encapsulant 130 can fully surround or flood the TIA 66, photodiode arrays 68, VCSEL arrays 72, and VCSEL driver 70 as best shown in FIG. 10, and fill gaps between the optical block 78 and the VCSEL and photodiode arrays 72, 68. The array of third lenses 158 can be moved to the first side 110 of the optical block 78 and fit into or immediately adjacent to the third recess 142 of the ferrule mate 80. The ferrule mate 80 can be attached to the optical block 78 and form a seal around the third recess 142 and between the optical block 78 and the ferrule mate 80.

The interconnect module TOM shown in FIG. 27 can be devoid of a lid 152, which can reduce the overall height of the interconnect module 10M. The static latch frame 214 can be physically attached to the module substrate 32 or the module connector housing 34. The interconnect module TOM of FIG. 27 can include an optically transparent plate 136, such as a glass plate, attached to the ferrule mate 80, such as the first side 110 of the ferrule mate 80. A core of the at least one optical fiber 30 can be in physical contact with the optically transparent plate 136 when the ferrule or optical connector 64 is mated with the interconnect module 10M.

Lastly, FIG. 28 shows yet another interconnect module TON. Compared to the interconnect module 10M shown in FIG. 27, the interconnect module TON of FIG. 28 can include a first bushing 244 that can move independently with respect to the static latch frame 214. The first bushing 244 can define a first bushing recess 246, and the static latch frame 214 can define a complementary first guide hole recess 248. In combination, the first bushing recess 246 and the first guide hole recess 248 can receive an axle 192 of a third latch 182. Movement of the axle 192 and the first bushing 244 relative to the ferrule mate 80 is limited in some directions (mostly directions away the ferrule mate) by the static latch frame 214 and in some other directions (mostly directions toward the ferrule mate) by the ferrule mate 80 or a combination of both.

It is possible for the first bushing 244 to move relative to one of more of the ferrule mate 80, the static latch frame 214, and the module connector housing 34. When the third latch 182 is closed over the back side 188 of a ferrule or optical connector 64, the first bushing 244 is pushed against the fourth side 116 of the ferrule mate 80 with a force equal and opposite to the force applied by fingers 250 of the third latch 182 onto the back side 188 of the ferrule or optical connector 64. When the third latch 182 is open or unlatched, the first bushing 244, along with the latch axle 192 and the third latch 182, are free to move away from the fourth side 116 of the ferrule mate 80.

Any of the first, second or third latches 88, 182 can be a dual latch configured to both secure the ferrule or optical connector 64 to the interconnect module 10-1, 10-2, 10-3, 10, 10A-10B and the interconnect module to the ring connector 16 or ring connector housing 50. Any first, second or third latch 88, 182 can be configured to not extend beyond a mounting or mating footprint of the ring connector 16 or ring connector housing 50.

Any sealed interconnect module 10-1, 10-2, 10-3, 10, 10A-10N described herein can be configured to be immersion cooled, such as described in PCT Publication WO2020150551. Any interconnect module 10-1, 10-2, 10-3, 10, 10A-10N can be configured to pass standardized shock and vibration testing. For example, shock and vibration can be passed when one or more of the optical block 78, TIA 66, photodiodes 68, 70 VCSEL driver, and 72 VCSEL are attached to the module substrate 32, the ferrule mate 80 is attached to the lid 152 and the ferrule or optical connector 64 is secured to the ferrule or optical connector 64. The module interconnect module 10-1, 10-2, 10-3, 10, 10A-10N or the transceiver 12 can be well-cradled by the ring connector 16 or ring connector housing 50. Screw down attachment, such as shown in FIG. 7A, can also be used.

As described herein, the environment can include salt spray, dust, pollen, liquids, condensation, dirt, oil, jet fuel, and other unwanted contaminants. Sealed versions of interconnect modules 10-1, 10-2, 10-3, 10, 10A-10N or transceivers 12 can be sealed from the environment. Interconnect modules described herein can also be configured to be used at high altitudes, such as 10,000 feet above sea level and higher, such as approximately 80,000 feet above sea level.

Any element of any disclosed embodiment can be added, deleted, substituted with, or combined with any other element of any one or one or more disclosed embodiments. For example, ceramics can be substituted for organic substrate material, and vice versa. Any type of movable bushing or non-movable bushing can be used or substituted an any embodiment. Laser ablation can be used or not used in any embodiment. A plate can be used or not used in any embodiment that has a ferrule mate. A latch can be used in any embodiment that has a removable ferrule, such as a MT ferrule. Any ferrules described herein a removable can be permanently attached to the interconnect module, the lid, or the substrate. Any feature described with respect to any one specific interconnect module 10-1, 10-2, 10-3, 10, 10A-10N or interconnect module assembly 18 can be used with any other interconnect module 10-1, 10-2, 10-3, 10, 10A-10N or interconnect module assemblies 18.

The terms "upward," "upper," "up," "above," and derivatives thereof are used herein with reference to the upward direction. The terms "downward," "lower," "down," "below," and derivatives thereof are used herein with reference to the downward direction. Of course, it should be appreciated that the actual orientation of the vertical insertion interconnect system shown in FIG. 1 can vary during use, and that the terms upward and downward and their respective derivatives can be consistently used as described herein regardless of the orientation of the vertical insertion interconnect system and components thereof during use.

It should be appreciated that the illustrations and discussions of the embodiments shown in the figures are for exemplary purposes only and should not be construed limiting the disclosure. One skilled in the art will appreciate that the present disclosure contemplates various embodiments. Additionally, it should be understood that the concepts described above with the above-described embodiments may be employed alone or in combination with any of the other embodiments described above. It should be further appreciated that the various alternative embodiments described above with respect to one illustrated embodiment can apply to all embodiments as described herein, unless otherwise indicated.

What is claimed:

1. An interconnect module configured to mate with a ring connector, the interconnect module comprising:
   a module connector housing mounted to a module substrate, the module connector housing having four sides, wherein the module connector housing has two rows of electrical contacts arranged on two sides of the four sides of the module connector housing, and the two rows of electrical contacts are configured to mate with electrically conductive ring contacts of the ring connector;
   an interconnect module housing carried by the module substrate;
   an optical engine including a ferrule mate; and
   a rotatable latch mounted to the interconnect module housing, the rotatable latch configured to releasably compress an optical connector that is configured to receive optical fibers against the ferrule mate, such that the ferrule mate couples light between an optical component of the optical engine and the optical fibers.

2. The interconnect module of claim 1, wherein the ferrule mate defines a first side, a second side, a third side, and a fourth side.

3. The interconnect module of claim 2, wherein the first side comprises at least one first recess.

4. The interconnect module of claim 3, wherein the first side defines at least one of 1) at least one first focusing lens and 2) at least one collimating lens positioned in the at least one first recess.

5. The interconnect module of claim 4, wherein the first side defines at least one of 1) at least one second focusing lens and 2) at least one second collimating lens positioned in the at least one first recess.

6. The interconnect module of claim 3, wherein the first side defines one of 1) at least one second recess positioned adjacent to the at least one first recess, and 2) at least one second recess spaced apart from the at least one first recess.

7. The interconnect module of claim 3, further comprising at least one spacing reference that is positioned adjacent to the at the least one first recess.

8. The interconnect module of claim 4, further comprising an optically transparent plate positioned adjacent to the first side and defining a first sealed gap between the optically transparent plate and the first focusing lens or the first collimating lens.

9. The interconnect module of claim 2, wherein the second side defines at least one third recess.

10. The interconnect module of claim 2, wherein the third side defines at least one reflection surface.

11. The interconnect module of claim 10, wherein the reflection surface is intentionally degraded by laser ablation.

12. The interconnect module of claim 10, further comprising a reflection surface cover plate positioned over the at least one reflection surface.

13. The interconnect module of claim 12, further comprising a second sealed gap defined between the reflection surface and the reflection surface cover plate.

14. The interconnect module of claim 12, wherein the reflection surface is intentionally degraded by laser ablation after the reflection surface cover plate is positioned adjacent to the third surface.

15. An interconnect module of claim 2, wherein:
    the optical connector includes a ferrule, and
    when the optical connector is mated to the interconnect module and the rotatable latch is in an engaged position, opposed forces applied to a back of the ferrule and to the fourth side of the ferrule mate cause the rotatable latch to compress the ferrule and the ferrule mate together.

16. The interconnect module of claim 1, wherein the rotatable latch is floating, yet captive, within the interconnect module housing.

17. The interconnect module of claim 1, wherein the interconnect module housing comprises a lid that carries the ferrule mate, wherein an intersection between the ferrule mate and the lid experiences no sheer stress when the rotatable latch is closed.

18. The interconnect module of claim 17, wherein the lid is optically transparent.

19. The interconnect module of claim 18, wherein an electro-optical element is flip-chip mounted to the lid.

20. The interconnect module of claim 19, further comprising a heat spreader including a riser that is configured to conduct unwanted heat from the electro-optical element to the heat spreader.

21. The interconnect module of claim 1, wherein the optical connector and the ferrule mate are adjacent each other along a direction, and the optical connector is disposed between a latch retention surface of the latch and the ferrule mate with respect to the direction when the latch is closed.

22. The interconnect module of claim 1, wherein the latch is configured to apply a force to a back side of the optical connector that compresses the optical connector against the ferrule mate.

23. The interconnect module of claim 1, wherein the latch is rotationally retained by the interconnect module housing so as to rotate about a pivot point.

24. The interconnect module of claim 1, wherein the rotatable latch comprises an axle that is received in a guide hole defined by the interconnect module housing, wherein the guide hole has an inner diameter that is greater than an outer diameter of the axle.

25. The interconnect module of claim 1, wherein the latch comprises a bridge that limits or prevents the optical connector from rotating when an upward or downward force is applied to the optical fibers.

26. The interconnect module of claim 1, wherein the ferrule mate is optically transparent.

* * * * *